(12) United States Patent
Nagata

(10) Patent No.: US 11,085,947 B2
(45) Date of Patent: Aug. 10, 2021

(54) INERTIAL SENSOR, SENSOR DEVICE, ELECTRONIC DEVICE, AND VEHICLE

(71) Applicant: SEIKO EPSON CORPORATION, Tokyo (JP)

(72) Inventor: Kazuyuki Nagata, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 16/542,568

(22) Filed: Aug. 16, 2019

(65) Prior Publication Data
US 2020/0064368 A1 Feb. 27, 2020

(30) Foreign Application Priority Data
Aug. 21, 2018 (JP) .............................. JP2018-154485

(51) Int. Cl.
*G01P 15/125* (2006.01)
*G05D 1/02* (2020.01)
*G01P 15/08* (2006.01)

(52) U.S. Cl.
CPC ............ *G01P 15/125* (2013.01); *G05D 1/027* (2013.01); *G01P 2015/0831* (2013.01); *G05D 2201/0213* (2013.01)

(58) Field of Classification Search
CPC ........... G01P 15/125; G01P 2015/0831; G05D 1/027; G05D 2201/0213
See application file for complete search history.

(56) References Cited

U.S. PATENT DOCUMENTS

| 5,226,321 A | 7/1993 | Varnham et al. | |
|---|---|---|---|
| 5,473,945 A * | 12/1995 | Grieff | G01C 19/5719 73/504.04 |
| 5,635,639 A * | 6/1997 | Greiff | G01C 19/5719 73/504.04 |
| 6,563,106 B1 * | 5/2003 | Bowers | B81B 3/004 250/208.1 |
| 6,629,460 B2 * | 10/2003 | Challoner | G01C 19/5719 73/504.02 |
| 6,767,758 B1 * | 7/2004 | Geen | G01C 19/5719 438/48 |
| 6,823,734 B1 * | 11/2004 | Hayworth | B81B 3/0062 73/504.12 |
| 6,935,175 B2 * | 8/2005 | Eskridge | G01P 15/0802 73/514.21 |
| 6,990,863 B2 * | 1/2006 | Challoner | G01C 19/5719 73/504.12 |

(Continued)

FOREIGN PATENT DOCUMENTS

WO WO2014/156119 A 10/2014

*Primary Examiner* — David J Bolduc
(74) *Attorney, Agent, or Firm* — Workman Nydegger

(57) ABSTRACT

A physical quantity sensor includes: a substrate; a movable object disposed displaceably with respect to the substrate; an electrode provided at a position facing the movable object on the substrate; an anchor portion fixing the movable object to the substrate; and a beam that is a rotation shaft of the movable object and connects the anchor portion and the movable object to each other, in which the movable object includes a first mass portion provided at one side of the beam, and a second mass portion provided at the other side of the beam, a first spring provided between the first mass portion and the beam, and a second spring provided between the second mass portion and the beam.

11 Claims, 14 Drawing Sheets

(56) References Cited

U.S. PATENT DOCUMENTS

| | | | | |
|---|---|---|---|---|
| 7,017,410 B2* | 3/2006 | Challoner | G01C 19/5656 | 73/504.02 |
| 7,140,250 B2* | 11/2006 | Leonardson | G01P 15/125 | 73/504.14 |
| 2004/0035204 A1* | 2/2004 | Durante | G01C 19/5719 | 73/504.04 |
| 2004/0211258 A1* | 10/2004 | Geen | G01C 19/5719 | 73/510 |
| 2005/0199061 A1 | 9/2005 | Acar et al. | | |
| 2006/0277997 A1* | 12/2006 | Foster | G01P 15/18 | 73/514.32 |
| 2007/0220973 A1* | 9/2007 | Acar | G01P 15/18 | 73/504.12 |
| 2008/0092652 A1* | 4/2008 | Acar | G01C 19/5712 | 73/504.02 |
| 2008/0110260 A1* | 5/2008 | Konno | G01P 15/125 | 73/514.32 |
| 2009/0031809 A1* | 2/2009 | Lin | G01P 15/125 | 73/514.32 |
| 2009/0139331 A1* | 6/2009 | Axelrod | G01P 15/125 | 73/514.32 |
| 2009/0183570 A1* | 7/2009 | Acar | G01P 15/125 | 73/514.32 |
| 2010/0024553 A1* | 2/2010 | Classen | G01P 15/0802 | 73/514.32 |
| 2010/0024554 A1* | 2/2010 | Classen | G01P 15/125 | 73/514.32 |
| 2010/0058864 A1* | 3/2010 | Hsu | G01P 15/125 | 73/514.32 |
| 2010/0281980 A1* | 11/2010 | Yazawa | G01P 15/0802 | 73/514.32 |
| 2011/0023606 A1* | 2/2011 | Burghardt | G01P 15/125 | 73/514.32 |
| 2011/0030473 A1* | 2/2011 | Acar | G01P 15/125 | 73/504.12 |
| 2011/0031959 A1* | 2/2011 | Konno | G01P 15/18 | 324/162 |
| 2011/0138912 A1* | 6/2011 | Degawa | G01P 1/023 | 73/504.12 |
| 2011/0154899 A1* | 6/2011 | Classen | G01P 15/125 | 73/514.32 |
| 2012/0031186 A1* | 2/2012 | Classen | G01P 15/08 | 73/514.32 |
| 2012/0216616 A1* | 8/2012 | Schultz | G01P 15/125 | 73/514.38 |
| 2012/0297879 A1* | 11/2012 | Ullrich | G01P 15/125 | 73/514.32 |
| 2012/0318060 A1* | 12/2012 | Ruby | G01P 15/125 | 73/514.32 |
| 2013/0192371 A1* | 8/2013 | Rytkonen | G01P 15/18 | 73/514.32 |
| 2013/0319117 A1* | 12/2013 | McNeil | G01P 15/18 | 73/514.32 |
| 2014/0007685 A1* | 1/2014 | Zhang | G01P 15/125 | 73/514.32 |
| 2014/0083190 A1* | 3/2014 | Kaack | G01P 15/135 | 73/514.14 |
| 2015/0020591 A1* | 1/2015 | Tanaka | B81B 3/0021 | 73/514.32 |
| 2015/0096378 A1* | 4/2015 | Kigure | G01P 1/003 | 73/514.32 |
| 2015/0268268 A1* | 9/2015 | Liu | G01P 15/125 | 73/514.32 |
| 2016/0084872 A1* | 3/2016 | Naumann | G01P 15/125 | 73/514.32 |
| 2016/0097791 A1* | 4/2016 | Zhang | B81B 3/0021 | 73/514.32 |
| 2016/0370397 A1* | 12/2016 | Lin | G01P 15/18 | |
| 2017/0184628 A1* | 6/2017 | Hsu | B81B 3/0072 | |
| 2017/0219620 A1* | 8/2017 | Jeong | G01P 15/08 | |
| 2017/0363655 A1* | 12/2017 | Zhang | G01P 15/125 | |
| 2018/0231579 A1* | 8/2018 | Geisberger | G01P 15/125 | |
| 2018/0275161 A1* | 9/2018 | Tang | G01P 15/125 | |
| 2019/0062149 A1* | 2/2019 | Tanaka | B81B 7/0048 | |
| 2019/0063924 A1* | 2/2019 | Tanaka | G01P 15/125 | |
| 2019/0064202 A1* | 2/2019 | Tanaka | G01C 19/5705 | |
| 2019/0101566 A1* | 4/2019 | Inaba | G01C 19/5628 | |
| 2019/0162539 A1* | 5/2019 | Kihara | G01C 19/5705 | |

* cited by examiner

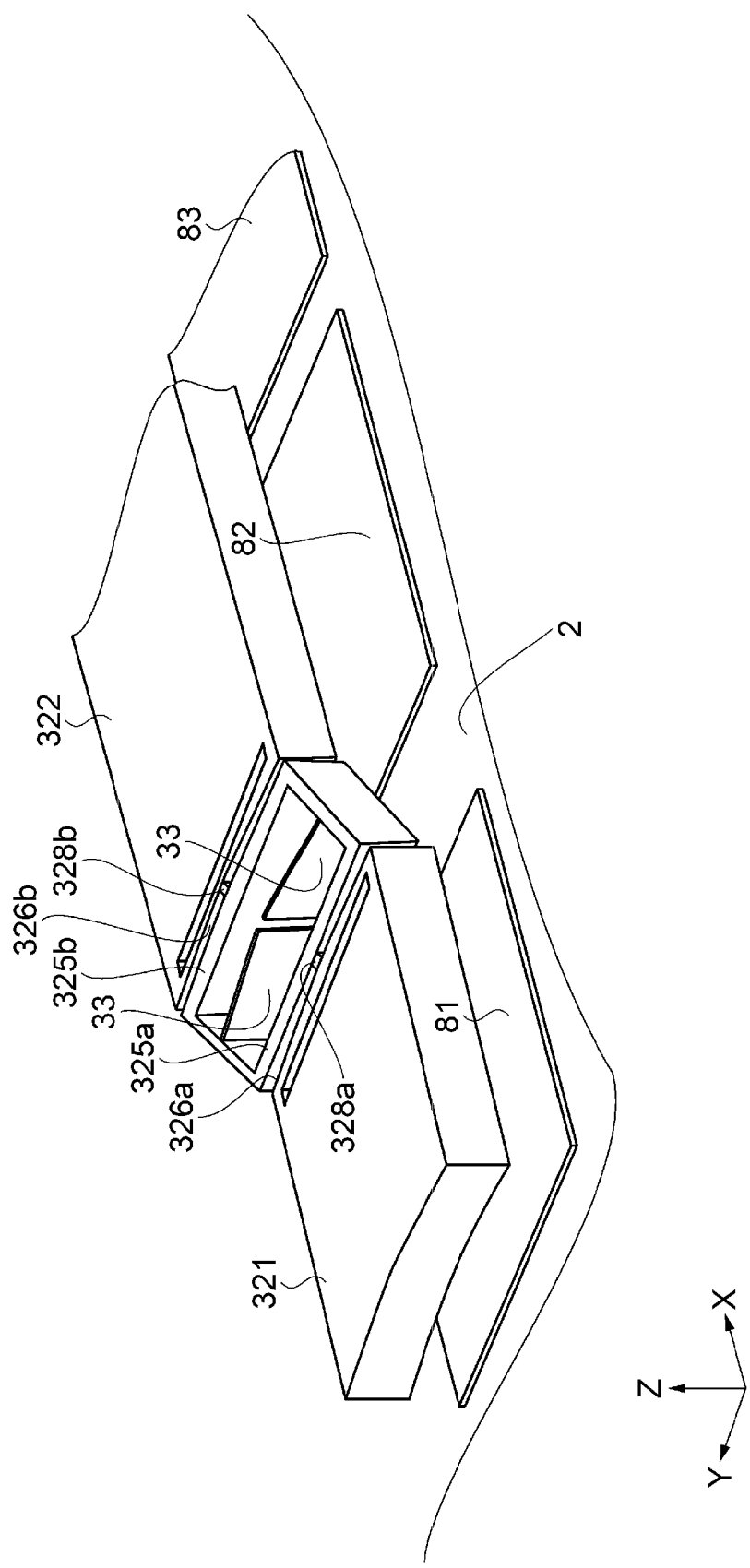

INERTIAL SENSOR, SENSOR DEVICE, ELECTRONIC DEVICE, AND VEHICLE

The present application is based on, and claims priority from JP Application Serial Number 2018-154485, filed Aug. 21, 2018, the disclosure of which is hereby incorporated by reference herein in its entirety.

BACKGROUND

1. Technical Field

The present disclosure relates to an inertial sensor, a sensor device, an electronic device, and a vehicle.

2. Related Art

In the related art, as a physical quantity sensor for detecting an inertial force such as acceleration, there is known a MEMS device provided with a movable portion (movable object) supported so as to be capable of oscillating and a supporting substrate disposed with a gap at a position facing the movable portion. For example, in JP-A-2014-209082, a movable portion which is disposed apart from a supporting substrate and can be rotated in accordance with acceleration in a normal direction of the supporting substrate (direction intersecting the supporting substrate) and a lower electrode disposed on the supporting substrate in a state of facing the movable portion are provided, and it is described that the movable portion has a torsion beam that serves as a rotation shaft during rotation and is supported by the supporting substrate via an anchor portion, and an acceleration sensor has a first portion facing the lower electrode and a second portion facing the lower electrode.

In such an acceleration sensor, by applying an inertial force to the movable portion and twisting the torsion beam, the movable portion moves like a seesaw in an out-of-surface direction about the torsion beam as a shaft, thereby, capacitance of the movable portion and the lower electrode fluctuates, and acceleration can be obtained by detecting a change in the capacitance. A displacement of such a movable portion is large at a position (distal end position) farthest from the torsion beam in the movable portion, and a displacement of the movable portion is small at a position near the torsion beam. The lower electrodes facing the first portion and the second portion disposed on both sides of the torsion beam, are desired to be at the same position with respect to the torsion beam on a first portion side and a second portion side of the movable portion, in order to prevent a difference in linearity of a capacity change. Therefore, the lower electrodes are disposed at positions close to the torsion beam on both the first portion side and the second portion side.

However, as described above, when the lower electrodes are disposed at the positions close to the torsion beam on both the first portion side and the second portion side of the movable portion (movable object), a displacement of the movable portion at the position where the lower electrode is disposed becomes smaller than the distal end position, and there is a problem that a displacement of the movable portion cannot be detected efficiently.

SUMMARY

A physical quantity sensor according to an aspect of the present disclosure includes a substrate; a movable object disposed displaceably with respect to the substrate; an electrode provided at a position facing the movable object on the substrate; an anchor portion fixing the movable object to the substrate; and a beam that is a rotation shaft of the movable object and connects the anchor portion and the movable object to each other, in which the movable object includes a first mass portion provided at one side of the beam, and a second mass portion provided at the other side of the beam, a first spring provided between the first mass portion and the beam, and a second spring provided between the second mass portion and the beam.

The physical quantity sensor may include a second beam fixed to the substrate and connected to the first mass portion, and a third beam fixed to the substrate and connected to the second mass portion.

The physical quantity sensor may include a frame portion positioned at an outer periphery of the movable object and provided with a gap from the movable object, a second beam connecting the frame portion and the first mass portion to each other, and a third beam connecting the frame portion and the second mass portion to each other.

In the physical quantity sensor, a mass of the second mass portion may be larger than a mass of the first mass portion.

In the physical quantity sensor, the electrode may include a first electrode facing the first mass portion and a second electrode facing the second mass portion.

In the physical quantity sensor, the first spring and the beam may be connected to each other by a first connecting portion, the second spring and the beam may be connected to each other by a second connecting portion, and rigidity of the beam may be lower than rigidity of the first connecting portion and the second connecting portion.

A sensor device according to another aspect of the present disclosure includes any one of the physical quantity sensors described above and an electronic component electrically coupled to the physical quantity sensor.

An electronic device according to still another aspect of the present disclosure includes any one of the physical quantity sensors described above and a control unit that performs a control based on a detection signal output from the physical quantity sensor.

A vehicle according to still another aspect of the present disclosure includes any one of the physical quantity sensors described above and a control unit that performs a control based on a detection signal output from the physical quantity sensor.

BRIEF DESCRIPTION OF THE DRAWINGS

FIG. 4 is a perspective view schematically showing oscillating of a movable object provided in the physical quantity sensor shown in FIG. 1.

DESCRIPTION OF EXEMPLARY EMBODIMENTS

In the following, a physical quantity sensor, a sensor device, an electronic device, and a vehicle of the present disclosure will be described in detail based on embodiments shown in the attached drawings. Note that not all of the configurations described in the following embodiments are necessarily essential components of the present disclosure. Further, in each drawing, for convenience of explanation, some components may be omitted. Further, in each drawing, to make it easy to understand, the dimensional ratio of each component is different from actual.

1. Physical Quantity Sensor

First Embodiment

Figure 1:
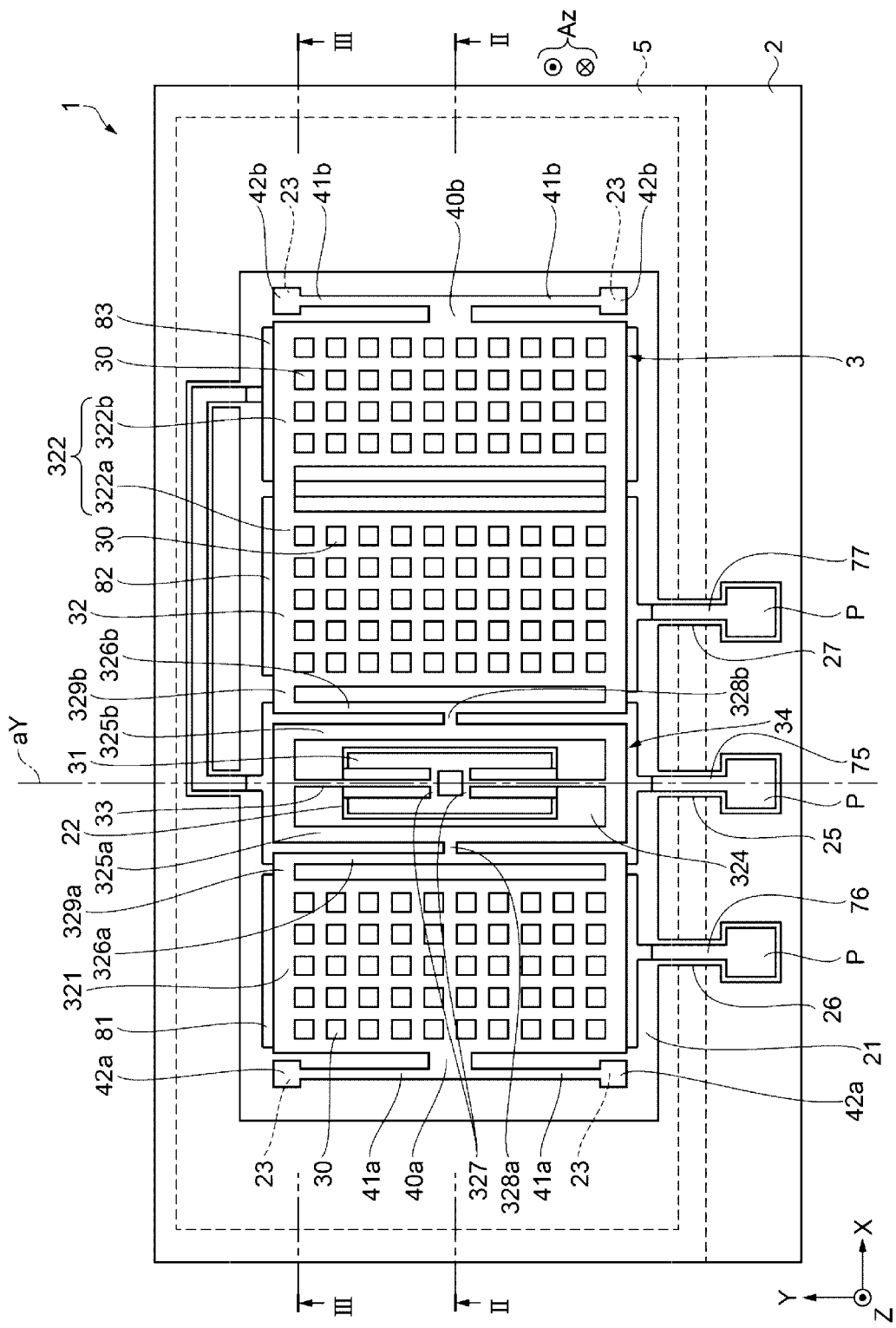
FIG. 1 is a plan view (top view) showing a physical quantity sensor according to a first embodiment of the present disclosure.
Figure 2:
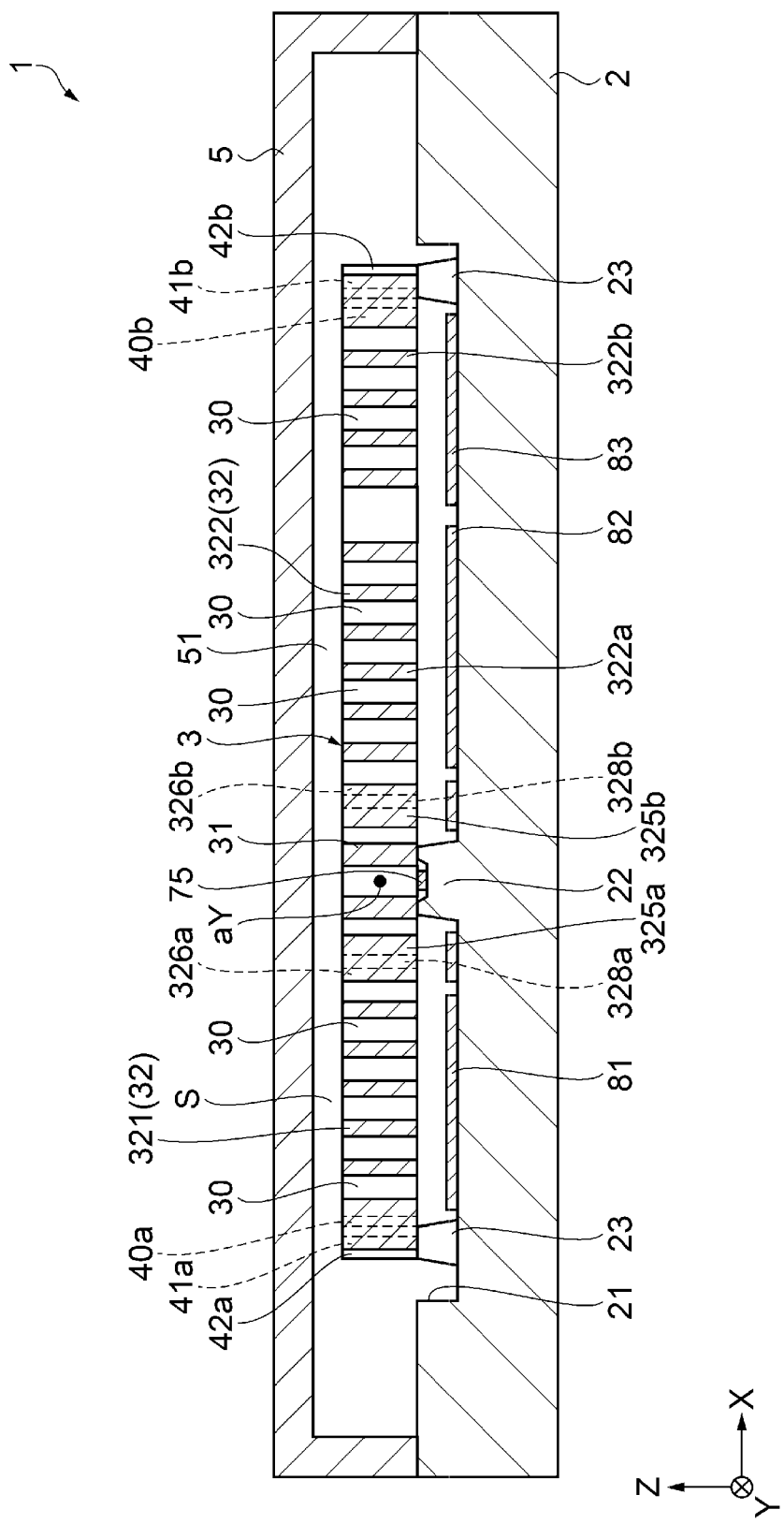
FIG. 2 is a cross-sectional view taken along line II-II in FIG. 1.
Figure 3:
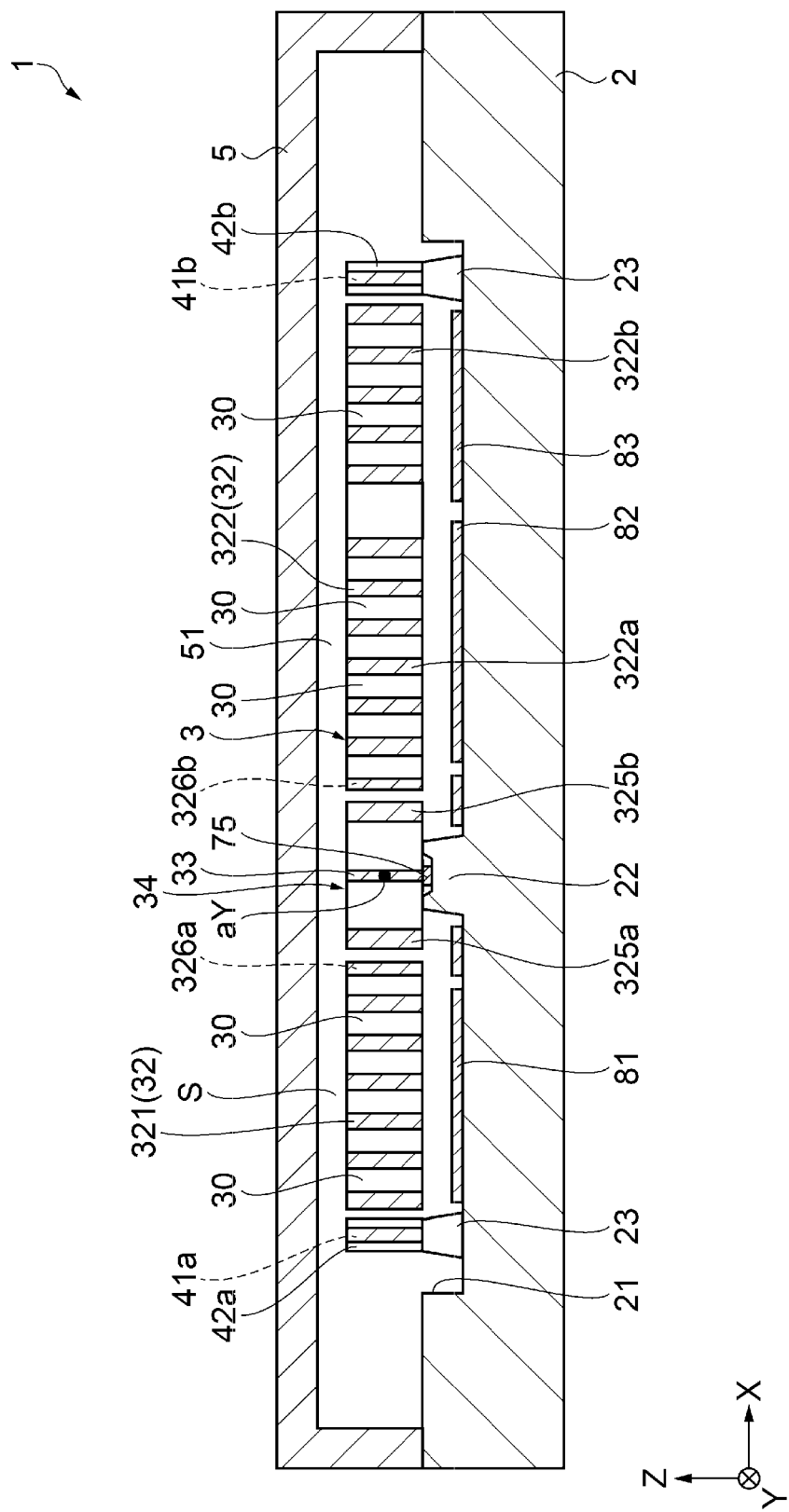
FIG. 3 is a cross-sectional view taken along line III-III in FIG. 1.

A physical quantity sensor according to a first embodiment of the present disclosure will be described with reference to FIGS. 1, 2, 3, and 4. FIG. 1 is a plan view (top view) showing a physical quantity sensor according to a first embodiment of the present disclosure. Note that in FIG. 1, for convenience, a lid is shown in perspective. FIG. 2 is a cross-sectional view taken along line II-II in FIG. 1. FIG. 3 is a cross-sectional view taken along line III-III in FIG. 1. FIG. 4 is a perspective view schematically showing oscillating of a movable object provided in the physical quantity sensor shown in FIG. 1. Note that in each drawing, for convenience of explanation, an X-axis, a Y-axis and a Z-axis are illustrated as three axes orthogonal to each other, and set a distal end side of an arrow to "+" and a proximal end side of an arrow to "−", which represent each axis. Further, in the following, a direction parallel to the X-axis is referred to as "X-axis direction", a direction parallel to the Y-axis is referred to as "Y-axis direction", and a direction parallel to the Z-axis is referred to as "Z-axis direction". Further, the +Z-axis direction side is referred to as "up" or "upper", and the −Z-axis direction side is referred to as "down" or "lower".

The physical quantity sensor 1 shown in FIGS. 1, 2 and 3 is used, for example, as an inertial sensor, and specifically, as an acceleration sensor capable of measuring an acceleration Az in the Z-axis direction. Such a physical quantity sensor 1 has a substrate 2, an oscillating structure (element portion) 3 disposed on the substrate 2, and a lid 5 joined to the substrate 2 so as to cover the oscillating structure 3.

Hereinafter, each portion will be sequentially described in detail.

Substrate

The substrate 2 has a recess portion 21 opened on an upper surface which is a surface on an upper side of the substrate 2. Further, in plan view from the Z-axis direction, the recess portion 21 is formed larger than the oscillating structure 3 so as to enclose the oscillating structure 3 inside. The recess portion 21 functions as an escaping portion for preventing contact between the oscillating structure 3 and the substrate 2. Further, as shown in FIG. 2, the substrate 2 has a projection-form mount 22 provided on a bottom surface of the recess portion 21 and a second mount 23. Then, the oscillating structure 3 is joined to the top surfaces of the mount 22 and the second mount 23. Thereby, the oscillating structure 3 can be fixed to the substrate 2 in a state of being separated from a bottom surface of the recess portion 21. Also, as shown in FIG. 1, the substrate 2 has grooves 25, 26, and 27 opened on upper surfaces.

As the substrate 2, it is preferable to have an insulating property, and for example, a glass substrate made of a glass material (for example, a borosilicate glass such as a Pyrex (registered trademark) glass or a Tampax (registered trademark) glass) containing alkali metal ions (movable ion such as $Na^+$) can be used. Here, in a case where the substrate 2 is made of a glass material containing alkali metal ions, when the lid 5 or the oscillating structure 3 is made of silicon, a joining of the lid 5 or the oscillating structure 3 and the substrate 2 can be performed by an anode joining. However, a constituent material of the substrate 2 is not particularly limited, and for example, a silicon substrate or a ceramic substrate may be used. Note that an insulating film such as a silicon oxide film or a silicon nitride film may be formed on a surface of the substrate 2 as necessary.

Further, the substrate 2 has electrodes. The electrodes are configured to include a first fixed electrode 81 as a first electrode, a second fixed electrode 82 as a second electrode, and a dummy electrode 83 disposed on a bottom surface of the recess portion 21. Further, the substrate 2 has wirings 75, 76, and 77 disposed inside grooves 25, 26, and 27. One end portions of the wirings 75, 76, and 77 are exposed to the outside of the lid 5, respectively, and function as electrode pads P performing an electrical coupling with an external device. Further, as shown in FIG. 2, the wiring 75 is routed to the mount 22, and is electrically coupled to the oscillating structure 3 on the mount 22. The wiring 75 is also electrically coupled to the dummy electrode 83. Further, the wiring 76 is electrically coupled to the first fixed electrode 81, and the wiring 77 is electrically coupled to the second fixed electrode 82.

The constituent materials of the first fixed electrode 81, the second fixed electrode 82, the dummy electrode 83, and the wirings 75, 76, and 77 are not particularly limited as long as they have conductivity, and for example, an oxide (transparent electrode material) such as ITO (Indium Tin Oxide), IZO (Indium Zinc Oxide), $In_2O_3$, $SnO_2$, $SnO_2$ containing Sb, and ZnO containing Al, and Au, Pt, Ag, Cu, Al, or alloys containing Au, Pt, Ag, Cu, and Al, or the like may be mentioned, and one or two or more of these can be used in combination.

Oscillating Structure

The oscillating structure 3 is provided above the substrate 2 as shown in FIGS. 1, 2, and 3. The oscillating structure 3 has a anchor portion 31 as an anchor portion joined to an upper surface of the mount 22 which is provided on the substrate 2, a movable object 32 which is separated from the substrate 2 and provided to face the substrate 2 and is displaceable with respect to the anchor portion 31, and a supporting beam 33 as a beam coupling the anchor portion 31 and the movable object 32 together. Then, when an acceleration Az works along the Z-axis direction, as shown in FIG. 4, the movable object 32 oscillates with the supporting beam 33 as a rotation shaft (center shaft of oscillation) aY while torsionally deforming the supporting beam 33. In other words, the movable object 32 is configured so as to be capable of so-called seesaw oscillating, in which, for example, a minus side in the X-axis direction is displaced to a minus side in the Z-axis direction, and a plus side in the X-axis direction is displaced to a plus side in the Z-axis direction, with respect to the anchor portion 31, and with the rotation shaft (center shaft of oscillation) aY as a center shaft. That is, the movable object 32 is provided so as to be rotationally displaced in a direction intersecting the substrate 2 with the supporting beam 33 as a rotation shaft aY (center shaft of oscillation).

The movable object 32 has a rectangular shape whose long side is in the X-axis direction in plan view from the Z-axis direction. The movable object 32 has a first mass portion 321 positioned at a minus side in the X-axis direction with respect to the rotation shaft aY, a second mass portion 322 positioned at a plus side in the X-axis direction with respect to the rotation shaft aY, and a connecting portion 34 connecting the first mass portion 321 and the second mass portion 322 to each other in a displaceable manner. That is, the first mass portion 321 and the second mass portion 322 are provided at both sides of the supporting beam 33 in the X-axis direction. In other words, the first mass portion 321 is provided at one side of the supporting beam 33 and the second mass portion 322 is provided at the other side of the supporting beam 33.

The movable object 32 is coupled to the supporting beam 33 in the connecting portion 34. Further, the second mass portion 322 is longer in the X-axis direction than the first mass portion 321, and when an acceleration Az is applied, the rotational moment (torque) of the second mass portion 322 is larger than that of the first mass portion 321. When an acceleration Az is applied, the movable object 32 oscillates around the rotation shaft aY due to a difference between the rotational moments.

The connecting portion 34 is configured to include a first spring 326a and a first connecting portion 325a provided on the first mass portion 321 side with respect to the rotation shaft aY, and a second spring 326b and a second connecting portion 325b provided on the second mass portion 322 side with respect to the rotation shaft aY.

The first spring 326a is between the two first coupling portions 329a coupled to both ends of the plus and minus sides of the first mass portion 321 in the Y-axis direction, and has a gap with the first mass portion 321 and extends along the Y-axis direction. The first connecting portion 325a is coupled to the first spring 326a by a second coupling portion 328a joined to the center portion of the first spring 326a in the Y-axis direction. The first connecting portion 325a is extended along an outer periphery of the anchor portion 31 with a gap and connected to the second connecting portion 325b, and is connected to the supporting beam 33 as a beam at the connection part. That is, the first spring 326a and the supporting beam 33 as a beam are connected to each other by the first connecting portion 325a.

The second spring 326b is between the two first coupling portions 329b coupled to both ends of the plus and minus sides of the second mass portion 322 in the Y-axis direction, and has a gap with the second mass portion 322 and extends along the Y-axis direction. The second connecting portion 325b is connected to the second spring 326b by a second coupling portion 328b coupled to the center portion of the second spring 326b in the Y-axis direction. The second connecting portion 325b is extended along an outer periphery of the anchor portion 31 with a gap and connected to the first connecting portion 325a, and is connected to the supporting beam 33 as a beam at the connection part. That is, the second spring 326b and the supporting beam 33 as a beam are connected to each other by the second connecting portion 325b.

Here, rigidity of the supporting beam 33 is configured to be lower than rigidity of the first connecting portion 325a and the second connecting portion 325b. With such a configuration, since the first connecting portion 325a and the second connecting portion 325b are less likely to deform than the supporting beam 33, the rotation of the supporting beam 33 when a force (physical quantity) is applied to the movable object 32 such that the supporting beam 33 rotates in a direction intersecting the substrate 2 as a rotation shaft, can be transmitted to the first spring 326a and the second spring 326b by rotational displacement of the first connecting portion 325a and the second connecting portion 325b.

As described above, the movable object 32 is connected to the supporting beam 33 as a beam at a connection part between the first connecting portion 325a and the second connecting portion 325b in the connecting portion 34. The connection part of the first connecting portion 325a and the second connecting portion 325b is provided at a position overlapping with the rotation shaft (center shaft of oscillation) aY in plan view from the Z-axis direction. That is, the movable object 32 is divided into the first mass portion 321 and the second mass portion 322 with the rotation shaft (center shaft of oscillation) aY as a boundary in plan view from the Z-axis direction.

Further, the second mass portion 322 is configured to be longer in the X-axis direction than the first mass portion 321.

Therefore, an area of the second mass portion 322 is larger than that of the first mass portion 321 in plan view, and since the mass is increased, a rotational moment (torque) of the second mass portion 322 is larger than that of the first mass portion 321 when an acceleration Az is applied. When the acceleration Az is applied, the movable object 32 oscillates around the rotation shaft aY due to a difference between the rotational moments. Note that in the following, a proximal end portion of the second mass portion 322 and a part symmetrical to the first mass portion 321 with respect to the rotation shaft aY is also referred to as a "proximal portion 322a", and a distal end portion of the second mass portion 322 and a part asymmetrical to the first mass portion 321 with respect to the rotation shaft aY is also referred to as a "torque generation portion 322b". With such a configuration, moments around the center shaft of oscillation of the first mass portion 321 and the second mass portion 322 can be easily made different.

Further, the movable object 32 has an opening port 324, which is surrounded by the first connecting portion 325a and the second connecting portion 325b between the first mass portion 321 and the second mass portion 322, and in the opening port 324, the anchor portions 31, the supporting beam 33, and a coupling beam 327 which connects between the two anchor portions 31 and is connected to the supporting beam 33, are disposed. By adopting such a shape, a miniaturization of the oscillating structure 3 can be achieved. Further, the supporting beam 33 extends along the Y-axis direction to form a rotation shaft aY.

However, the disposition of the anchor portion 31 or the supporting beam 33 is not particularly limited, and, for example, it may be positioned outside the movable object 32.

Further, the movable object 32 is extended from the end on the minus side in the X-axis direction of the first mass portion 321 to both directions on the plus side and the minus side in the Y-axis direction via the coupling portion 40a, and has second beams 41a fixed to the second mounts 23 provided on the substrate 2 with respective fixing ends 42a. That is, the fixing end 42a of the second beam 41a is fixed to the substrate 2, and the second beam 41a is connected to the first mass portion 321. The second beam 41a is capable of torsional and deflective deformation with respect to the second mount 23, and along with the displacement of the first mass portion 321 in the Z-axis direction, it is possible to perform the torsional and deflective deformation with respect to the second mount 23. That is, the second beam 41a has a support function of supporting the displacement of the first mass portion 321 in the Z-axis direction.

Further, the movable object 32 is extended from the end on the plus side in the X-axis direction of the second mass portion 322 to both directions on the plus side and the minus side in the Y-axis direction via the coupling portion 40b, and has third beams 41b fixed to the second mounts 23 provided on the substrate 2 with respective fixing ends 42b. That is, the fixing end 42b of the third beam 41b is fixed to the substrate 2, and the third beam 41b is connected to the second mass portion 322. The third beam 41b is capable of torsional and deflective deformation with respect to the second mount 23, and along with the displacement of the second mass portion 322 in the Z-axis direction, it is possible to perform the torsional and deflective deformation with respect to the second mount 23. That is, the third beam 41b has a support function of supporting the displacement of the second mass portion 322 in the Z-axis direction.

In this way, the first mass portion 321 is fixed to the substrate 2 (second mount 23) by the second beam 41a, and the second mass portion 322 is fixed to the substrate 2 (second mount 23) by the third beam 41b. Therefore, the first mass portion 321 can support a displacement by the supporting beam 33 and a plurality of beams of the second beams 41a, and a second mass portion 322 can support by the supporting beam 33 and a plurality of beams of the third beams 41b. Thereby, the displacement of the first mass portion 321 and the second mass portion 322 with respect to a force (physical quantity) can be stabilized, and a detection accuracy can be improved.

Here, the description will return to the electrodes (the first fixed electrode 81, the second fixed electrode 82, and the dummy electrode 83). In plan view from the Z-axis direction, the first fixed electrode 81 as a first electrode is disposed to face the first mass portion 321. Further, the second fixed electrode 82 as a second electrode is disposed to face the second mass portion 322 and proximal portion 322a. The dummy electrode 83 is disposed to face the torque generation portion 322b of the second mass portion 322. When the physical quantity sensor 1 is driven, a predetermined voltage is applied to the oscillating structure 3, an electrostatic capacitance Ca is formed between the first fixed electrode 81 and the first mass portion 321, and an electrostatic capacitance Cb is formed between the second fixed electrode 82 and the proximal portion 322a of the second mass portion 322.

Here, an oscillation of the movable object 32 when an acceleration Az is applied to the physical quantity sensor 1 will be described with reference to FIG. 4. When the acceleration Az is applied to the physical quantity sensor 1, the movable object 32 oscillates about the rotation shaft aY while torsionally deforming the supporting beam 33 due to a difference between rotational moments of the first mass portion 321 and the second mass portion 322. Here, the first connecting portion 325a and the second connecting portion 325b which received the rotation of the supporting beam 33 are higher in rigidity than the supporting beam 33 and difficult to be deformed, thereby, the first connecting portion 325a and the second connecting portion 325b are rotationally displaced so that the whole is inclined about the rotation shaft aY. Along with this, the first mass portion 321 and the second mass portion 322 also try to be rotationally displaced in the Z-axis direction, but the first spring 326a disposed between the first mass portion 321 and the first connecting portion 325a, and the second spring 326b disposed between the second mass portion 322 and the second connecting portion 325b, deflect in a direction intersecting the substrate 2 due to their own spring property, thereby the rotational displacement is absorbed by the deflection. Therefore, the first mass portion 321 and the second mass portion 322 can be displaced in the Z-axis direction substantially orthogonal to the first fixed electrode 81 or the second fixed electrode 82. In other words, the first mass portion 321 and the second mass portion 322 can be displaced in a direction intersecting the substrate 2 on which the first fixed electrode 81 or the second fixed electrode 82 is provided.

By such oscillation (displacement) of the movable object 32, each of a gap between the first mass portion 321 and the first fixed electrode 81 and a gap between the proximal portion 322a of the second mass portion 322 and the second fixed electrode 82 changes, and according to the change, each of capacitances Ca and Cb changes. Therefore, the physical quantity sensor 1 can detect an acceleration Az based on the amount of change in the capacitances Ca and Cb.

Figure 5A:
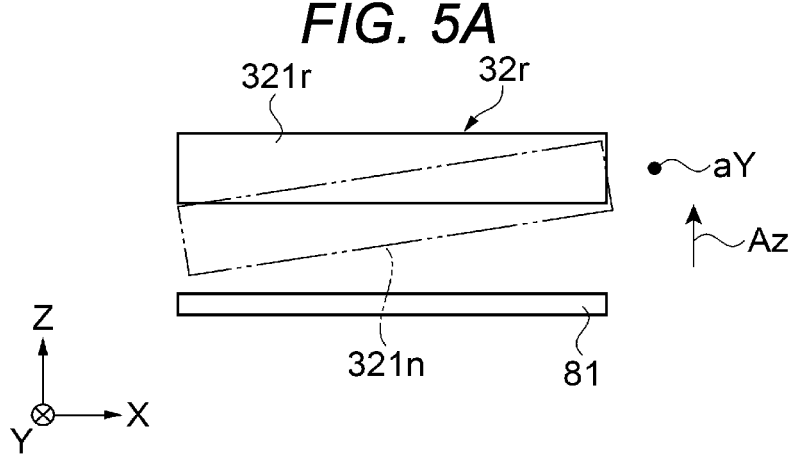
FIG. 5A is a cross-sectional view showing an operation state of a movable object of a physical quantity sensor in the related art.
Figure 5B:
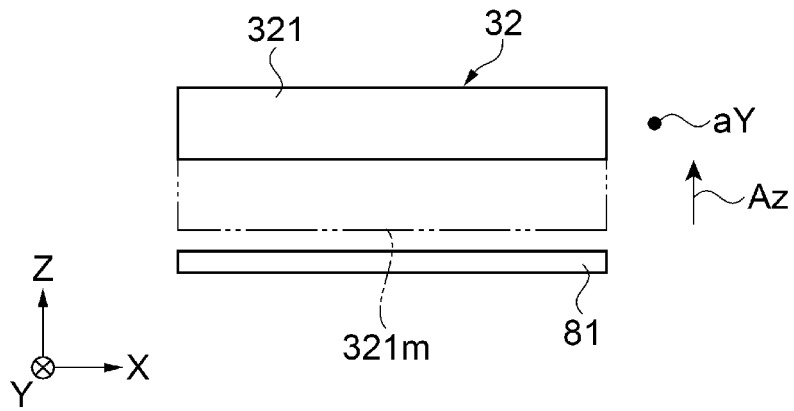
FIG. 5B is a cross-sectional view showing an operation state of the movable object of the physical quantity sensor according to the first embodiment.
Figure 6:
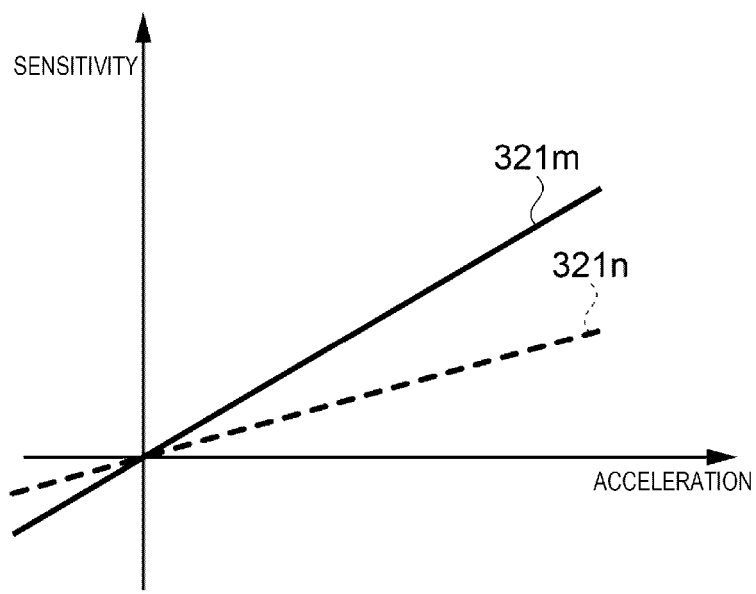
FIG. 6 is a graph for explaining an effect of the physical quantity sensor according to the first embodiment.

Note that the oscillation (displacement) of the movable object 32 is displaced in the Z-axis direction (direction intersecting the substrate 2) substantially orthogonal to the first fixed electrode 81 or the second fixed electrode 82, thereby the displacement of the first mass portion 321 and the second mass portion 322 can be efficiently detected with a wide area of electrodes. This will be described with reference to FIGS. 5A, 5B, and 6. FIG. 5A is a cross-sectional view showing an operation state of a movable object of a physical quantity sensor in the related art, as a comparative example. FIG. 5B is a cross-sectional view showing an operation state of the movable object of the physical quantity sensor according to the first embodiment. FIG. 6 is a graph for explaining an effect of the physical quantity sensor according to the first embodiment.

A first mass portion 321r constituting a movable object 32r in the related art shown in FIG. 5A, rotates about a rotation shaft aY when an acceleration Az is applied, and is inclined such that a distance to a first fixed electrode 81 becomes closer as a distance from the rotation shaft aY increases, as in a first mass portion 321n after a displacement indicated by two-dot chain lines in the drawing. Therefore, at a position near the rotation shaft aY (the supporting beam 33 shown in FIG. 1), a displacement amount of the first mass portion 321r is small, that is, a distance between the first mass portion 321r and the first fixed electrode 81 becomes large, and a displacement of the first mass portion 321r cannot be detected efficiently.

In contrast to this, in the first mass portion 321 constituting the movable object 32 according to the first embodiment shown in FIG. 5B, the rotation about the rotation shaft aY is absorbed by the deflection of the first spring 326a (see FIG. 1) when an acceleration Az is added, thereby the first mass portion 321 is displaced in the Z-axis direction substantially orthogonal to the first fixed electrode 81, as in a first mass portion 321m after a displacement indicated by two-dot chain lines in the drawing. Therefore, regardless of the distance to the rotation shaft aY, a distance between the first mass portion 321m and the first fixed electrode 81 is reduced, thereby the displacement of the first mass portion 321 can be efficiently detected with a wide area.

FIG. 6 shows the correlation between the magnitude of acceleration and the detection sensitivity with respect to the first mass portion 321r in the related art shown in FIG. 5A as a comparative example and the first mass portion 321 of the first embodiment shown in FIG. 5B. As shown in the graph in FIG. 6, the detection sensitivity using the first mass portion 321 (first mass portion 321m) of the first embodiment is substantially twice as high as compared with the detection sensitivity using the first mass portion 321r (first mass portion 321n) in the related art. In this way, in the first mass portion 321 (first mass portion 321m) of the first embodiment, the displacement of the first mass portion 321 can be efficiently detected. That is, in the configuration of the movable object 32 (see FIG. 1), the detection sensitivity with respect to an acceleration as a physical quantity can be improved.

Note that as the combination with the first mass portion 321 and the first fixed electrode 81 is exemplified in the description using FIGS. 5A, 5B, and 6 described above, the same effect also can be obtained in combination of the second mass portion 322 and the second fixed electrode 82 which constitute the movable object 32.

Further, in each of the first mass portion 321 and the second mass portion 322 shown in FIG. 1, a plurality of damping holes 30 passing through the movable object 32 in the thickness direction along the Z-axis are formed. The plurality of damping holes 30 are uniformly arranged over the entire area of the first mass portion 321 and the second mass portion 322, and in particular, in the present embodiment, the plurality of damping holes 30 are arranged in a matrix in the X-axis direction and the Y-axis direction. Further, each of the plurality of damping holes 30 has a square cross-sectional shape, and has the same shape and size. Also, the occupancy rates of the plurality of damping holes 30 are equal in the first mass portion 321, the proximal portion 322a, and the torque generation portion 322b.

Note that the above-mentioned "uniform" means that a separation distance between adjacent damping holes 30 in the X-axis direction and the Y-axis direction is the same for all the damping holes 30, and also means to include a case where some separation distances deviate slightly (for example, about 10% or less) from other separation distances in consideration of an error or the like that may occur in manufacturing. Similarly, the above-mentioned "square" means that a case when it corresponds with a square, and also means to include a case of a shape which a little turned from a square, for example, four corners are chamfered or R-attached (rounded) instead of having angled corners, at least one corner deviates from 90°, and the length of at least one side is different from the length of other sides, in consideration of an error or the like that may occur in manufacturing. Further, the above-mentioned "occupancy rates are equal" means that a case where the occupancy rates of the plurality of damping holes 30 in the first mass portion 321, the proximal portion 322a, and the torque generation portion 322b coincide, and also means to include, for example, a case where the occupancy rates deviate slightly (for example, about ±5% or less) in consideration of an error or the like that may occur in manufacturing.

Such an oscillating structure 3 can be formed, for example, by patterning a conductive silicon substrate doped with impurities such as phosphorus (P), boron (B), arsenic (As) by etching (especially dry etching). Further, when the substrate 2 is made of a glass material, a joining between the oscillating structure 3 and the substrate 2 can be performed by anode joining, and the oscillating structure 3 in the present embodiment is joined to an upper surface of the substrate 2 by the anode joining. However, the material of the oscillating structure 3 and the joining method between the oscillating structure 3 and the substrate 2 are not particularly limited. Further, the base material of the oscillating structure 3 may not have conductivity, and in this case, for example, a conductor layer such as metal may be formed on the surface of the movable object 32.

Lid

As shown in FIG. 2, the lid 5 has a recess portion 51 opened on the lower surface side. The lid 5 is joined to the upper surface of the substrate 2 so as to accommodate the oscillating structure 3 in the recess portion 51. With the lid 5 and the substrate 2, and on its inside, an accommodation space S which accommodates the oscillating structure 3 is formed.

The accommodation space S is an airtight space. Further, the accommodation space S is filled with an inert gas such as nitrogen, helium, argon, and it is preferable that the accommodation space S has a substantially atmospheric pressure at a service temperature (about −40° C. to 120° C.). However, the atmosphere of the accommodation space S is not particularly limited, and may be, for example, a reduced pressure state or a pressurized state.

As described above, since the grooves 25, 26 and 27 which straddle the inside and the outside of the accommodation space S are provided on the upper surface of the substrate 2, the inside and the outside of the accommodation space S are communicated via the grooves 25, 26 and 27 in a state where only the lid 5 is joined to the substrate 2. Here, for example, by providing a sealing portion, such as a $SiO_2$ film formed by using TEOS-CVD (chemical vapor deposition) method, or the like, in parts where the grooves 25, 26, and 27 are disposed (a joined part between the lid 5 and the substrate 2), the grooves 25, 26, and 27 can be closed to hermetically seal the accommodation space S.

For example, a silicon substrate can be used as the lid 5. However, a constituent material of the lid 5 is not particularly limited, and for example, a glass substrate or a ceramic substrate may be used. Further, the joining method between the substrate 2 and the lid 5 is not particularly limited, and may be appropriately selected depending on the material of the substrate 2 or the lid 5, for example, an anode joining, an activation joining that joins joining surfaces activated by a plasma irradiation, a joining by a joining material such as glass frit, and a diffusion joining that joins metal films formed on the upper surface of the substrate 2 and the lower surface of the lid 5, can be used.

In the present embodiment, the substrate 2 and the lid 5 are joined by using an anodic joining.

Note that the lid 5 is preferably coupled to the ground. Thereby, a potential of the lid 5 can be maintained constant, and, for example, a fluctuation of a capacitance between the lid 5 and the oscillating structure 3 can be reduced.

As for the physical quantity sensor 1 according to the first embodiment described above, when an acceleration Az is applied to the physical quantity sensor 1, the first connecting portion 325*a* and the second connecting portion 325*b* which have received the rotation of the supporting beam 33 are rotationally displaced so that the whole is inclined about the rotation shaft aY. Along with this, the first mass portion 321 and the second mass portion 322 also try to be rotationally displaced in the Z-axis direction, but the first spring 326*a* disposed between the first mass portion 321 and the second mass portion 322, and the second spring 326*b* disposed between the first connecting portion 325*a* and the second connecting portion 325*b*, deflect in a direction intersecting the substrate 2 due to their own spring property, thereby the rotational displacement is absorbed by the deflection. Therefore, the first mass portion 321 and the second mass portion 322 can be displaced in the Z-axis direction (direction intersecting the substrate 2) substantially orthogonal to the first fixed electrode 81 or the second fixed electrode 82. In this way, by displacing the first mass portion 321 and the second mass portion 322, changes in the electrostatic capacitances Ca and Cb between the first fixed electrode 81 and the second fixed electrode 82 can be efficiently detected. That is, by providing the configuration of the movable object 32, the detection sensitivity with respect to an acceleration as a physical quantity can be improved, and the physical quantity sensor 1 which improved the detection sensitivity can be obtained.

Further, the first mass portion 321 is fixed to the substrate 2 (second mount 23) by the second beam 41*a*, and the second mass portion 322 is fixed to the substrate 2 (second mount 23) by the third beam 41*b*. Therefore, the first mass portion 321 can support a displacement by the supporting beam 33 and a plurality of beams of the second beams 41*a*, and a second mass portion 322 can support by the supporting beam 33 and a plurality of beams of the third beams 41*b*. Thereby, the displacement of the first mass portion 321 and the second mass portion 322 with respect to a force (physical quantity) can be stabilized, and a detection accuracy can be improved.

Second Embodiment

Figure 7:
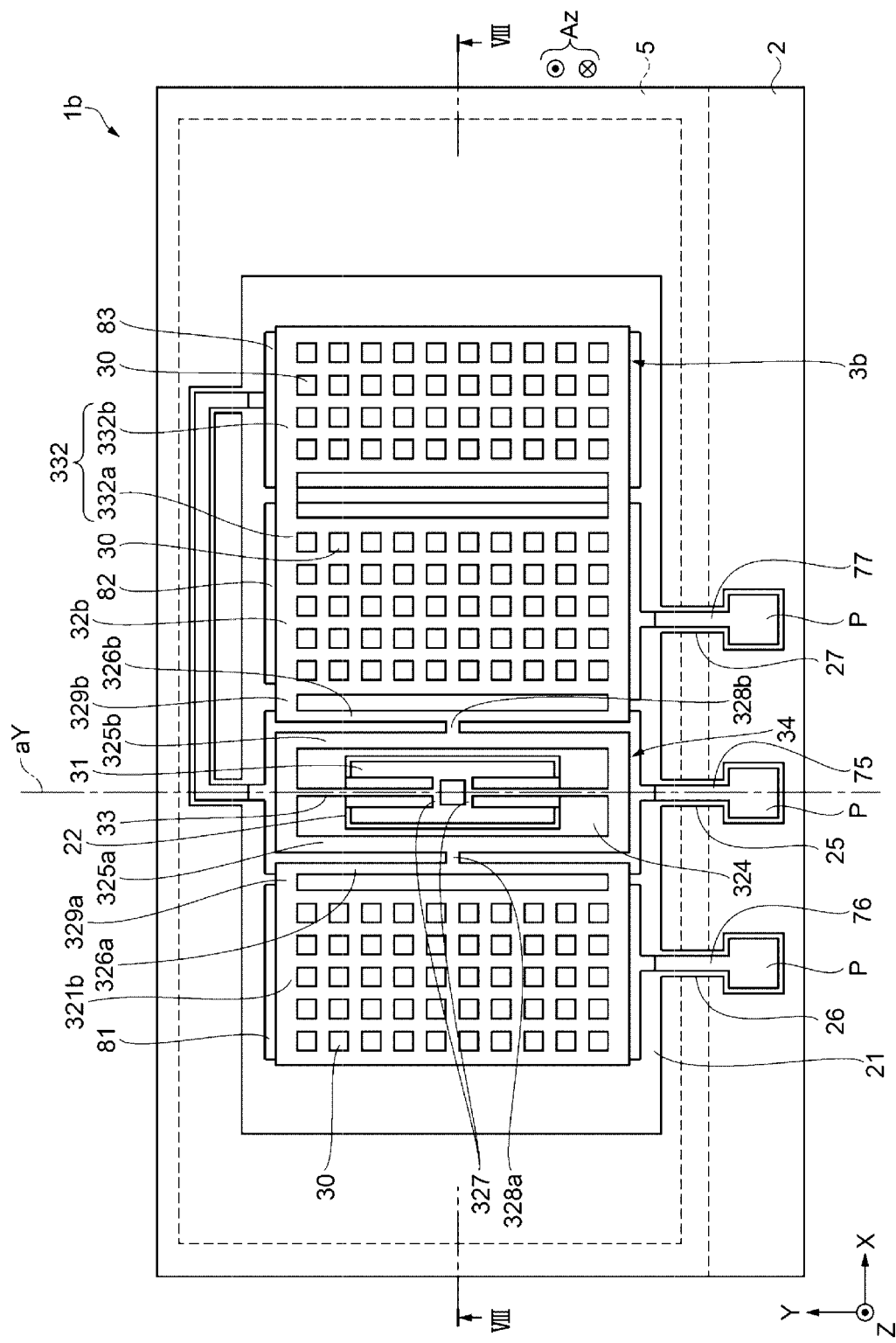
FIG. 7 is a plan view (top view) showing a physical quantity sensor according to a second embodiment of the present disclosure.
Figure 8:
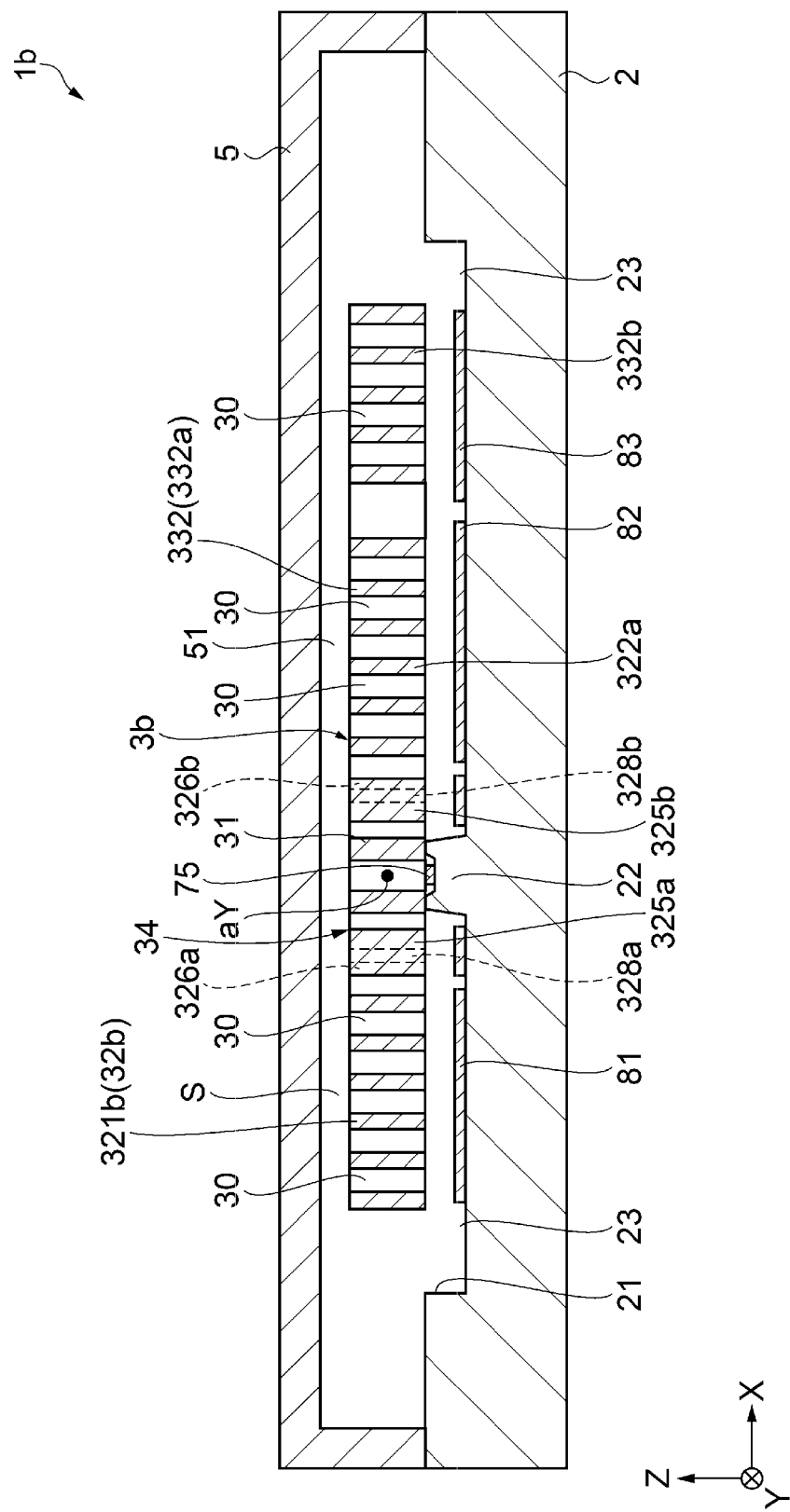
FIG. 8 is a cross-sectional view taken along line VIII-VIII in FIG. 7.

Next, a physical quantity sensor according to a second embodiment of the present disclosure will be described with reference to FIGS. 7 and 8. FIG. 7 is a plan view (top view) showing the physical quantity sensor according to the second embodiment of the present disclosure. FIG. 8 is a cross-sectional view taken along line VIII-VIII in FIG. 7. Note that the physical quantity sensor 1*b* according to the second embodiment is the same as the first embodiment described above except for the configuration of the movable object.

In the following description, the second embodiment will be described focusing on differences from the above-described first embodiment, the same items may be denoted by the same reference numerals, and the description thereof may be omitted.

The physical quantity sensor 1*b* shown in FIGS. 7 and 8 is used, for example, as an inertial sensor, and specifically, as an acceleration sensor capable of measuring an acceleration Az in the Z-axis direction. Such a physical quantity sensor 1*b* has a substrate 2, an oscillating structure (element portion) 3*b* disposed on the substrate 2, and a lid 5 joined to the substrate 2 so as to cover the oscillating structure 3*b*.

Substrate

The substrate 2 has a recess portion 21 opened on an upper surface side. Further, in plan view from the Z-axis direction, the recess portion 21 is formed larger than the oscillating structure 3*b* so as to enclose the oscillating structure 3*b* inside. The recess portion 21 functions as an escaping portion for preventing contact between the oscillating structure 3*b* and the substrate 2. Further, the substrate 2 has a projection-form mount 22 provided on a bottom surface of the recess portion 21. Then, the oscillating structure 3*b* is joined to the top surfaces of the mount 22. Thereby, the oscillating structure 3*b* can be fixed to the substrate 2 in a state of being separated from the bottom surface of the recess portion 21. Also, as shown in FIG. 7, the substrate 2 has grooves 25, 26, and 27 opened on upper surfaces.

Further, the substrate 2 has electrodes. The electrodes are configured to include a first fixed electrode 81, a second fixed electrode 82, and a dummy electrode 83 disposed on the bottom surface of the recess portion 21. Further, the substrate 2 has wirings 75, 76, and 77 disposed in the grooves 25, 26, and 27. One end portions of the wirings 75, 76, and 77 are exposed to the outside of the lid 5, respectively, and function as electrode pads P performing an electrical coupling with an external device. The wiring 75 is routed to the mount 22, and is electrically coupled to the oscillating structure 3*b* on the mount 22. Further, the wiring 75 is electrically coupled to the dummy electrode 83. Further, the wiring 76 is electrically coupled to the first fixed electrode 81, and the wiring 77 is electrically coupled to the second fixed electrode 82.

Oscillating Structure

The oscillating structure 3*b* is provided above the substrate 2. The oscillating structure 3*b* has a anchor portion 31 as an anchor portion joined to an upper surface of the mount 22 which is provided on the substrate 2, a movable object 32*b* which is provided to face the substrate 2 and is displaceable with respect to the anchor portion 31, and a supporting beam 33 as a beam coupling the anchor portion 31 and the movable object 32*b* together. Then, when an acceleration Az works along the Z-axis direction, as in the first embodiment, the movable object 32*b* oscillates with the supporting beam 33 as a rotation shaft (center shaft of oscillation) aY while torsionally deforming the supporting beam 33. In other words, the movable object 32*b* is configured so as to be capable of so-called seesaw oscillating, in which, for example, a minus side in the X-axis direction is displaced to a minus side in the Z-axis direction, and a plus side in the X-axis direction is displaced to a plus side in the Z-axis direction, with respect to the anchor portion 31, and with the rotation shaft (center shaft of oscillation) aY as a center shaft.

The movable object 32*b* has a rectangular shape whose long side is in the X-axis direction in plan view from the Z-axis direction. The movable object 32*b* has a first mass portion 321*b* positioned at a minus side in the X-axis direction with respect to the rotation shaft aY, a second mass portion 332 positioned at a plus side in the X-axis direction with respect to the rotation shaft aY, and a connecting portion 34 connecting the first mass portion 321b and the second mass portion 332 to each other in a displaceable manner. The movable object 32b is coupled to the supporting beam 33 in the connecting portion 34. Further, the second mass portion 332 is longer in the X-axis direction than the first mass portion 321b, and when an acceleration Az is applied, the rotational moment (torque) of the second mass portion 322 is larger than that of the first mass portion 321b. When the acceleration Az is applied, the movable object 32b oscillates around the rotation shaft aY due to a difference between the rotational moments. Note that in the following, a proximal end portion of the second mass portion 332 and a part symmetrical to the first mass portion 321b with respect to the rotation shaft aY is also referred to as a "proximal portion 332a", and a distal end portion of the second mass portion 332 and a part asymmetrical to the first mass portion 321b with respect to the rotation shaft aY is also referred to as a "torque generation portion 332b". Further, the movable object 32b has opening ends at an end of the first mass portion 321b on the minus side in the X-axis direction, and an end of the second mass portion 332 on the plus side in the X-axis direction.

The connecting portion 34 is configured to include a first spring 326a and a first connecting portion 325a provided on the first mass portion 321b side with respect to the rotation shaft aY, and a second spring 326b and a second connecting portion 325b provided at the second mass portion 332 side with respect to the rotation shaft aY. Note that, since each part which constitutes the connecting portion 34 is the same as that of the first embodiment, description here is omitted.

Further, the movable object 32b has an opening port 324 between the first mass portion 321b and the second mass portion 332, and the anchor portion 31 and the supporting beam 33 are disposed in the opening port 324. By adopting such a shape, a miniaturization of the oscillating structure 3b can be achieved. Further, the supporting beam 33 extends along the Y-axis direction to form a rotation shaft aY. However, the disposition of the anchor portion 31 or the supporting beam 33 is not particularly limited, and, for example, it may be positioned outside the movable object 32b.

Here, the description will return to the electrodes (the first fixed electrode 81, the second fixed electrode 82, and the dummy electrode 83). As in the first embodiment, in plan view from the Z-axis direction, the first fixed electrode 81 is disposed to face the first mass portion 321b. Further, the second fixed electrode 82 is disposed to face the second mass portion 332 and proximal portion 332a. The dummy electrode 83 is disposed to face the torque generation portion 332b of the second mass portion 332. When the physical quantity sensor 1b is driven, a predetermined voltage is applied to the oscillating structure 3b, an electrostatic capacitance Ca is formed between the first fixed electrode 81 and the first mass portion 321b, and an electrostatic capacitance Cb is formed between the second fixed electrode 82 and the proximal portion 332a of the second mass portion 332.

Here, when the acceleration Az is applied to the physical quantity sensor 1b, the movable object 32b oscillates about the rotation shaft aY while torsionally deforming the supporting beam 33 due to a difference between rotational moments of the first mass portion 321b and the second mass portion 332. Here, as in the first embodiment, the first connecting portion 325a and the second connecting portion 325b which received the rotation of the supporting beam 33 are higher in rigidity than the supporting beam 33 and difficult to be deformed, thereby, the first connecting portion 325a and the second connecting portion 325b are rotationally displaced so that the whole is inclined about the rotation shaft aY. Along with this, the first mass portion 321b and the second mass portion 332 also try to be rotationally displaced in the Z-axis direction, but the first spring 326a disposed between the first mass portion 321b and the first connecting portion 325a, and the second spring 326b disposed between the second mass portion 332 and the second connecting portion 325b, deflect in a direction intersecting the substrate 2 due to their own spring property, thereby the rotational displacement is absorbed by the deflection. Therefore, the first mass portion 321b and the second mass portion 332 can be displaced in the Z-axis direction substantially orthogonal to the first fixed electrode 81 or the second fixed electrode 82. In other words, the first mass portion 321b and the second mass portion 332 can be displaced in a direction intersecting the substrate 2 on which the first fixed electrode 81 or the second fixed electrode 82 is provided.

By such oscillation (displacement) of the movable object 32b, each of a gap between the first mass portion 321b and the first fixed electrode 81 and a gap between the proximal portion 332a of the second mass portion 332 and the second fixed electrode 82 changes, and according to the change, each of capacitances Ca and Cb changes. Therefore, the physical quantity sensor 1b can detect an acceleration Az based on the amount of change in the capacitances Ca and Cb.

As described above, the oscillation (displacement) of the movable object 32b is displaced in the Z-axis direction (direction intersecting the substrate 2) substantially orthogonal to the first fixed electrode 81 or the second fixed electrode 82, thereby the displacement of the first mass portion 321b and the second mass portion 332 can be efficiently detected with a wide area of electrodes.

Further, in each of the first mass portion 321b and the second mass portion 332, a plurality of damping holes 30 passing through the movable object 32b in the thickness direction along the Z-axis are formed. Note that since the plurality of damping holes 30 have the same configuration as the first embodiment, the description here is omitted.

Lid

As in the first embodiment, the lid 5 has a recess portion 51 opened on the lower surface side. The lid 5 is joined to the upper surface of the substrate 2 so as to accommodate the oscillating structure 3b in the recess portion 51.

With the lid 5 and the substrate 2, and on its inside, an accommodation space S which accommodates the oscillating structure 3b is formed. Note that the configuration of the lid 5 according to the second embodiment is the same as that of the first embodiment, so the detailed description will be omitted.

As for the physical quantity sensor 1b according to the second embodiment described above, the oscillation (displacement) of the movable object 32b is displaced in the Z-axis direction (direction intersecting the substrate 2) substantially orthogonal to the first fixed electrode 81 or the second fixed electrode 82, thereby the displacement of the first mass portion 321b and the second mass portion 332 can be efficiently detected with a wide area of electrodes.

Modification Example of Oscillating Structure

Figure 9:
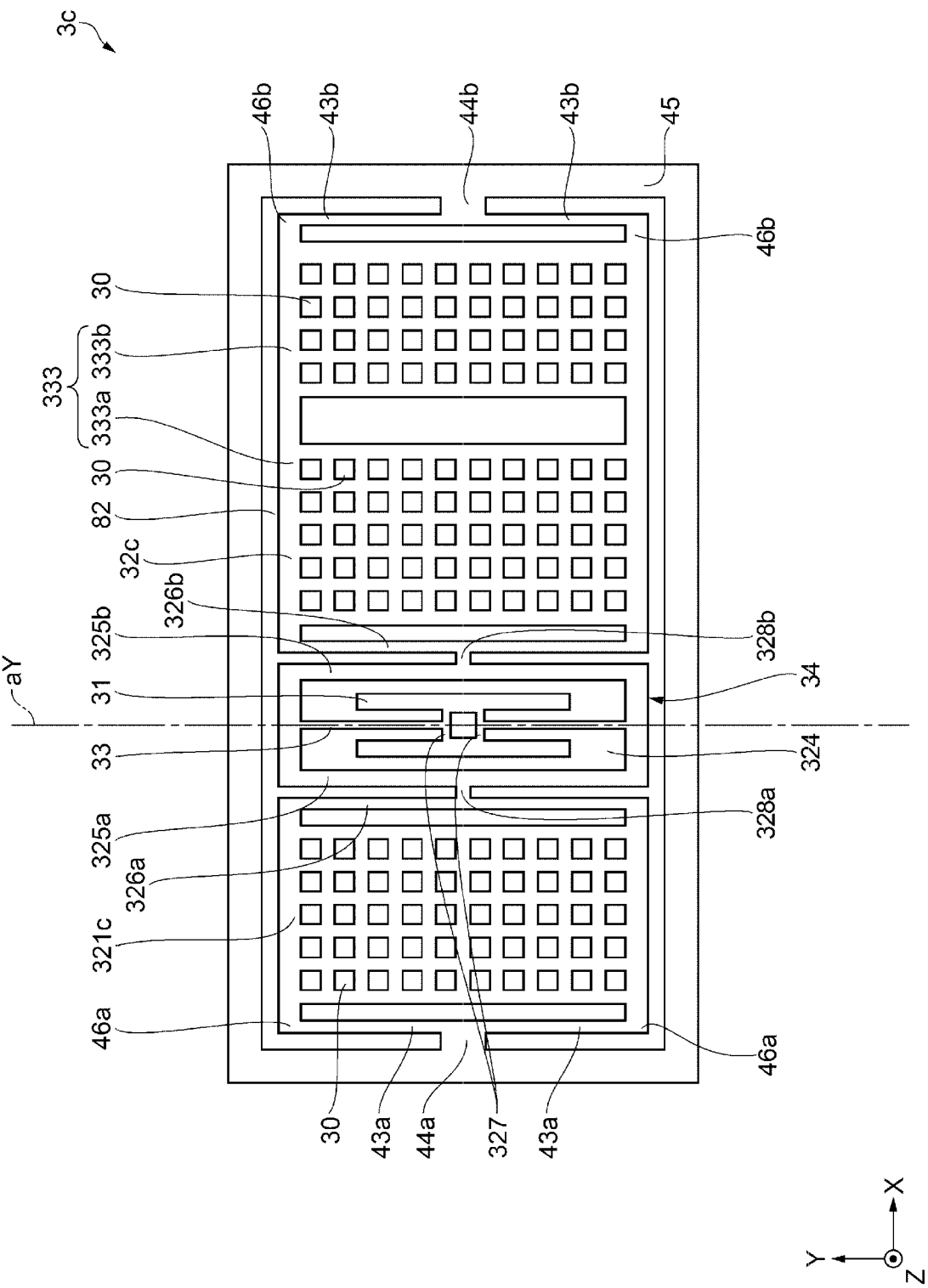
FIG. 9 is a plan view (top view) showing Modification Example of an oscillating structure.

Next, Modification Example of the oscillating structure will be described with reference to FIG. 9. FIG. 9 is a plan view (top view) showing Modification Example of the oscillating structure. Note that the oscillating structure 3c according to the present modification example shown in FIG. 9 is different from the oscillating structure 3 of the first embodiment described above, in the configuration having a frame portion 45 positioned at an outer periphery of the movable object 32c and provided with a gap from the movable object 32c, and in the configuration of a coupling between the movable object 32c and the frame portion 45, and the other configurations are the same. In the following description, the oscillating structure 3c according to Modification Example will be described focusing on differences from the above-described oscillating structure 3 of the first embodiment, the same items may be denoted by the same reference numerals, and the description thereof may be omitted.

As shown in FIG. 9, the oscillating structure 3c according to Modification Example is provided to face the anchor portion 31 as the anchor portion and the substrate 2 (see FIG. 1), and has a movable object 32c which is displaceable with respect to the anchor portion 31, a supporting beam 33 as a beam coupling the anchor portion 31 and the movable object 32c together, and a frame portion 45 positioned at the outer periphery of the movable object 32c and provided with a gap from the movable object 32c.

Then, when an acceleration Az works along the Z-axis direction, as in the first embodiment, the movable object 32c oscillates with the supporting beam 33 as a rotation shaft (center shaft of oscillation) aY while torsionally deforming the supporting beam 33. In other words, the movable object 32c is configured so as to be capable of so-called seesaw oscillating, in which, for example, a minus side in the X-axis direction is displaced to a minus side in the Z-axis direction, and a plus side in the X-axis direction is displaced to a plus side in the Z-axis direction, with respect to the anchor portion 31, and with the rotation shaft (center shaft of oscillation) aY as a center shaft. Note that the frame portion 45 may surround the periphery of the movable object 32c as shown in FIG. 9, and a part of the frame portion 45 may be cut off.

The movable object 32c has a rectangular shape whose long side is in the X-axis direction in plan view from the Z-axis direction. The movable object 32c has a first mass portion 321c positioned at a minus side in the X-axis direction with respect to the rotation shaft aY, a second mass portion 333 positioned at a plus side in the X-axis direction with respect to the rotation shaft aY, and a connecting portion 34 connecting the first mass portion 321c and the second mass portion 333 to each other in a displaceable manner. The movable object 32c is coupled to the supporting beam 33 in the connecting portion 34. Further, the second mass portion 333 is longer in the X-axis direction than the first mass portion 321c, and when an acceleration Az is applied, the rotational moment (torque) of the second mass portion 333 is larger than that of the first mass portion 321c. When the acceleration Az is applied, the movable object 32c oscillates around the rotation shaft aY due to a difference between the rotational moments. Note that in the following, a proximal end portion of the second mass portion 333 and a part symmetrical to the first mass portion 321c with respect to the rotation shaft aY is also referred to as a "proximal portion 333a", and a distal end portion of the second mass portion 333 and a part asymmetrical to the first mass portion 321c with respect to the rotation shaft aY is also referred to as a "torque generation portion 333b."

The connecting portion 34 is configured to include a first spring 326a and a first connecting portion 325a provided at the first mass portion 321c side with respect to the rotation shaft aY, and a second spring 326b and a second connecting portion 325b provided at the second mass portion 333 side with respect to the rotation shaft aY. Note that, since each part which constitutes the connecting portion 34 is the same as that of the first embodiment, description here is omitted.

Further, the movable object 32c has an opening port 324, which is surrounded by the first connecting portion 325a and the second connecting portion 325b between the first mass portion 321c and the second mass portion 333, and the anchor portion 31 and the supporting beam 33 are disposed in the opening port 324. By adopting such a shape, a miniaturization of the oscillating structure 3c can be achieved. Further, the supporting beam 33 extends along the Y-axis direction to form a rotation shaft aY. However, the disposition of the anchor portion 31 or the supporting beam 33 is not particularly limited, and, for example, it may be positioned outside the movable object 32c.

Further, the movable object 32c has an extending beam 43a as a second beam extended in both directions of the plus side and the minus side in the Y-axis direction via the coupling portion 46a, at the two corners of minus side end portions of the first mass portion 321c in the X-axis direction. The two extending beams 43a are extended along the minus side end of the first mass portion 321c in the X-axis direction with a gap from the first mass portion 321c and the frame portion 45, and are connected to a supporting portion 44a provided at a center portion in the Y-axis direction. The supporting portion 44a is connected to the frame portion 45. That is, the extending beam 43a connects the frame portion 45 and the first mass portion 321c to each other. The extending beam 43a is capable of torsional and deflective deformation, and along with the displacement of the first mass portion 321c in the Z-axis direction, it is possible to perform the torsional and deflective deformation.

Further, the movable object 32c has an extending beam 43b as a third beam extended in both directions of the plus side and the minus side in the Y-axis direction via the coupling portion 46b, at the two corners of plus side end portions of the second mass portion 333 in the X-axis direction. The two extending beams 43b are extended along the minus side end of the second mass portion 333 in the X-axis direction with a gap from the second mass portion 333 and the frame portion 45, and are connected to a supporting portion 44b provided at a center portion in the Y-axis direction. The supporting portion 44b is connected to the frame portion 45. That is, the extending beam 43b connects the frame portion 45 and the second mass portion 333 to each other. The extending beam 43b is capable of torsional and deflective deformation, and along with the displacement of the second mass portion 333 in the Z-axis direction, it is possible to perform the torsional and deflective deformation.

In this way, the first mass portion 321c is connected to the frame portion 45 by the extending beam 43a, and the frame portion 45 is fixed to a not-shown substrate (for example, the substrate 2 shown in FIG. 1). Thereby, the first mass portion 321c is supported for displacement by the supporting beam 33 and a plurality of beams of the extending beams 43a, and the second mass portion 333 is supported for displacement by the supporting beam 33 and a plurality of beams of the extending beams 43b. Thereby, the displacement of the first mass portion 321c and the second mass portion 333 with respect to a force (physical quantity) can be stabilized, and a detection accuracy can be improved.

As for to the oscillating structure 3c according to Modification Example, in addition to the supporting beam 33, the first mass portion 321c is connected to the frame portion 45 by the extending beam 43a, and the second mass portion 333 is connected to the frame portion 45 by the extending beam 43b. Since the frame portion 45 is positioned at the outer periphery of the movable object 32c, a secure fixation to the substrate 2 (see FIG. 1) is possible, and displacement of the first mass portion 321c and the second mass portion 333 can be supported by a plurality of beams (supporting beam 33 and extending beam 43a, or supporting beam 33 and extending beam 43b). Thereby, the displacement of the first mass portion 321c and the second mass portion 333 with respect to a force (physical quantity) can be stabilized, and a detection accuracy can be improved.

Modification Example of Anchor Portion

Figure 10:
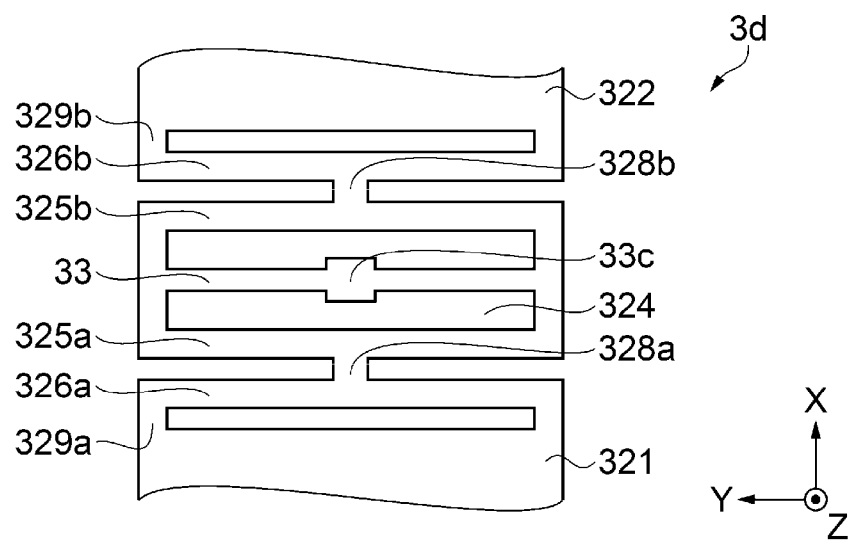
FIG. 10 is a plan view showing Modification Example 1 of an anchor portion for fixing an oscillating structure to a substrate.
Figure 11:
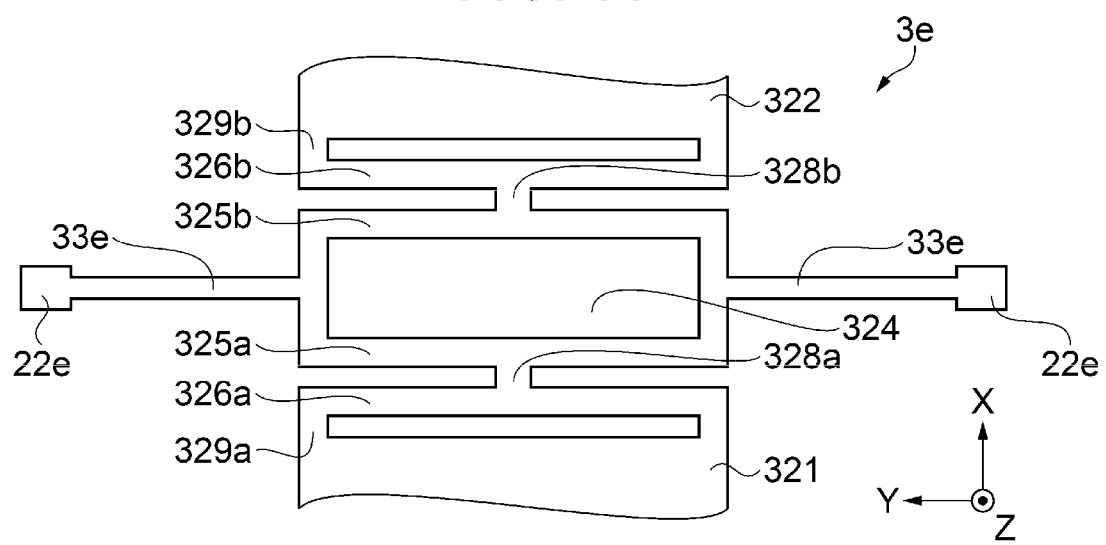
FIG. 11 is a plan view showing Modification Example 2 of an anchor portion.
Figure 12:
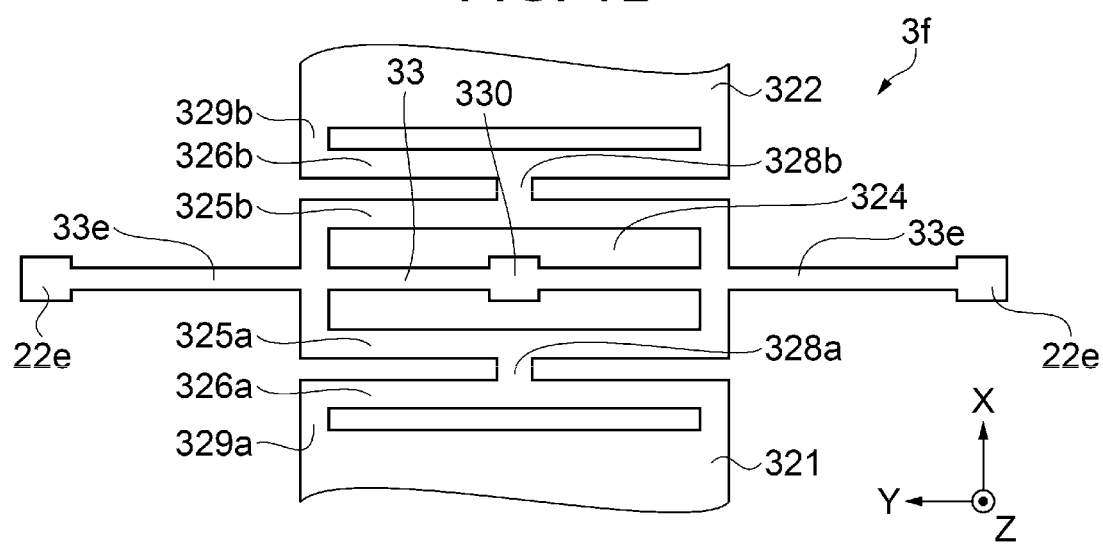
FIG. 12 is a plan view showing Modification Example 3 of an anchor portion.

Next, Modification Examples 1 to 3 of the anchor portion for fixing the oscillating structure to the substrate will be described with reference to FIGS. 10 to 12. FIG. 10 is a plan view showing Modification Example 1 of the anchor portion for fixing the oscillating structure to the substrate. FIG. 11 is a plan view showing Modification Example 2 of the anchor portion. FIG. 12 is a plan view showing Modification Example 3 of the anchor portion. Note that the same configurations as those in the first embodiment described above are denoted by the same reference numerals, and the description thereof will be omitted.

Modification Example 1 of Anchor Portion

As shown in FIG. 10, the anchor portion 33c as an anchor portion according to Modification Example 1 constituting the oscillating structure 3d is disposed inside the opening port 324, which is surrounded by the first connecting portion 325a and the second connecting portion 325b between the first mass portion 321 and the second mass portion 322. The anchor portion 33c is connected to an inside surface of the coupled part between the first connecting portion 325a and the second connecting portion 325b by the supporting beam 33 on the plus side and the minus side in the Y-axis direction. Note that the supporting beam 33 has a function of rotationally oscillating the first mass portion 321 and the second mass portion 322 by torsional deformation.

Modification Example 2 of Anchor Portion

As shown in FIG. 11, the anchor portion according to the Modification Example 2 constituting the oscillating structure 3e includes two second anchor portions 22e. The two second anchor portions 22e are disposed outside which is opposite to the opening port 324, the first connecting portion 325a, and the second connecting portion 325b. The two second anchor portions 22e are connected to outside surfaces of the coupled part between the first connecting portion 325a and the second connecting portion 325b by the supporting beam 33e on the plus side and the minus side in the Y-axis direction, respectively. Note that the supporting beam 33e has a function of rotationally oscillating the first mass portion 321 and the second mass portion 322 by torsional deformation.

Modification Example 3 of Anchor Portion

As shown in FIG. 12, the anchor portion according to the Modification Example 3 constituting the oscillating structure 3f includes a first anchor portion 330 and two second anchor portions 22e. The first anchor portion 330 is disposed inside the opening port 324, which is surrounded by the first connecting portion 325a and the second connecting portion 325b between the first mass portion 321 and the second mass portion 322. The two second anchor portions 22e are disposed outside which is opposite to the opening port 324, the first connecting portion 325a, and the second connecting portion 325b. The first anchor portion 330 is connected to an inside surface of the coupled part between the first connecting portion 325a and the second connecting portion 325b by the supporting beam 33 on the plus side and the minus side in the Y-axis direction. The two second anchor portions 22e are connected to outside surfaces of the coupled part between the first connecting portion 325a and the second connecting portion 325b by the supporting beam 33e on the plus side and the minus side in the Y-axis direction, respectively. Note that the supporting beams 33 and 33e have a function of rotationally oscillating the first mass portion 321 and the second mass portion 322 by torsional deformation.

According to above-mentioned Modification Examples 1 to 3, as in the first embodiment described above, the first mass portion 321 and the second mass portion 322 can be displaced in a direction intersecting the substrate 2 (see FIGS. 1 and 2) on which the first fixed electrode 81 or the second fixed electrode 82 (see FIGS. 1 and 2) is provided. Therefore, the same effect as that of the above-described embodiment can be obtained.

2. Sensor Device

Figure 13:
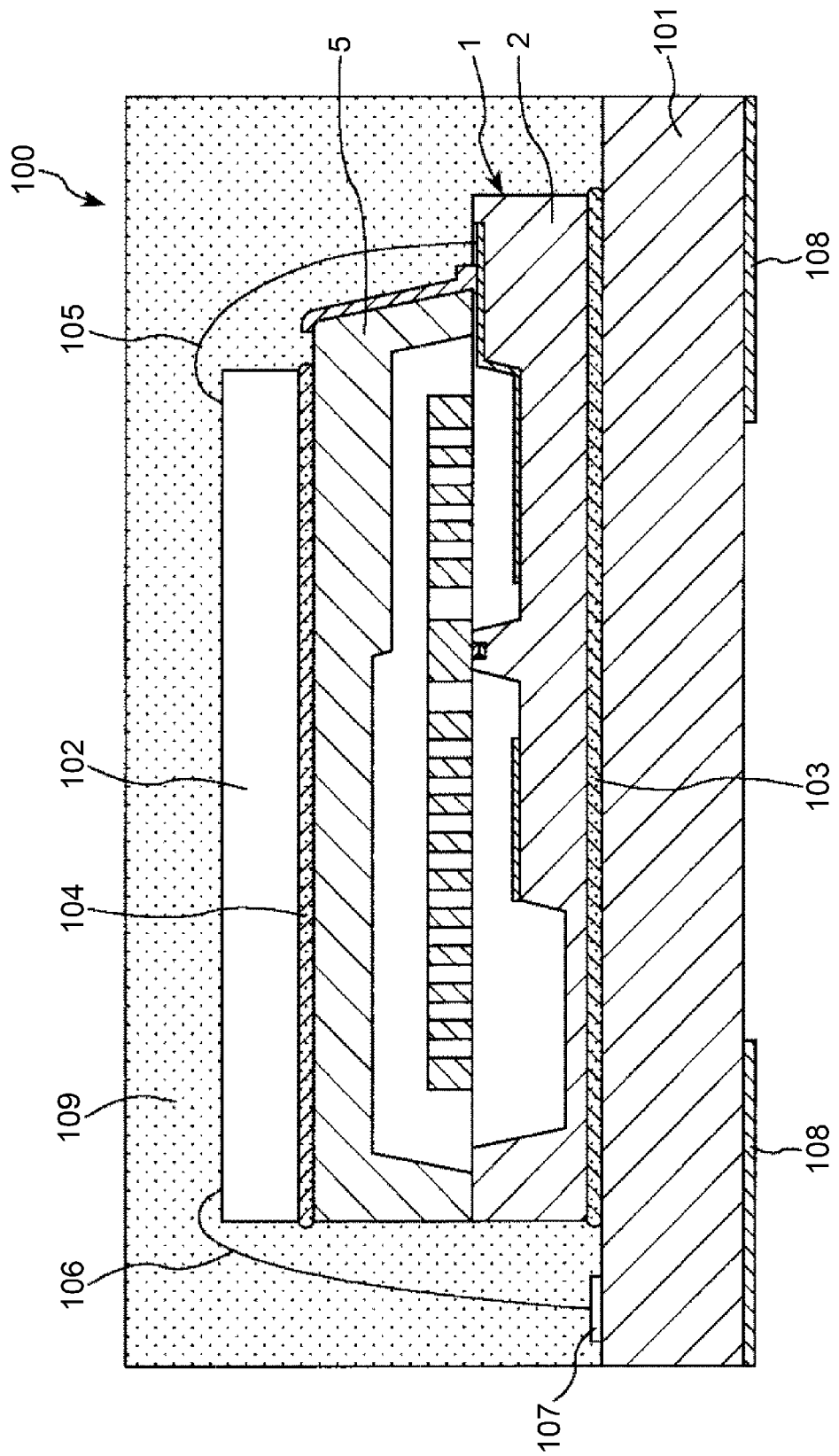
FIG. 13 is a cross-sectional view showing an example of a sensor device of the present disclosure.

Next, a sensor device according to the present disclosure will be described with reference to FIG. 13. FIG. 13 is a cross-sectional view showing an example of a sensor device according to the present disclosure.

As shown in FIG. 13, a sensor device 100 has a substrate 101, a physical quantity sensor 1 fixed to an upper surface of the substrate 101 via an adhesive layer 103, and an IC chip 102 as an electronic component fixed to an upper surface of the physical quantity sensor 1 via the adhesive layer 104. Then, the physical quantity sensor 1 and the IC chip 102 are molded by a molding material 109 in a state where the lower surface of the substrate 101 is exposed. Note that as the adhesive layers 103 and 104, for example, solder, silver paste, resin adhesive (die attach agent) or the like can be used. Also, for example, a thermosetting epoxy resin can be used as the molding material 109, and for example, it can be molded by using a transfer molding method.

Further, a plurality of terminals 107 are disposed on an upper surface of the substrate 101, and a plurality of mounting terminals 108 coupled to the terminals 107 via internal wirings and castellations (not shown) are disposed on a lower surface. Such a substrate 101 is not particularly limited, and for example, a silicon substrate, a ceramic substrate, a resin substrate, a glass substrate, a glass epoxy substrate, or the like can be used.

Further, the IC chip 102 includes, for example, a drive circuit for driving the physical quantity sensor 1, a correction circuit for correcting differential signals of electrostatic capacitances Ca and Cb, a detection circuit for detecting an acceleration from the differential signals of the capacitances Ca and Cb, and an output circuit for converting a signal from the detection circuit into a predetermined signal and outputting the converted signal. Such an IC chip 102 is electrically coupled to the wirings 75, 76, and 77 (electrode pad P) of the physical quantity sensor 1 via bonding wires 105, and is electrically coupled to the terminals 107 on the substrate 101 via bonding wires 106.

Such a sensor device 100 has excellent reliability because the sensor device 100 includes the physical quantity sensor 1 capable of efficiently detecting a physical quantity.

3. Electronic Device

Figure 14:
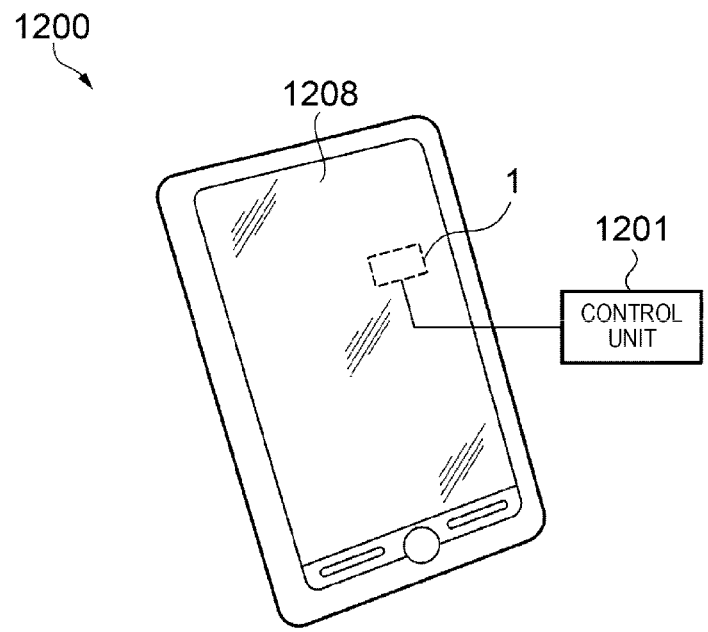
FIG. 14 is a perspective view schematically showing a configuration of a smartphone (mobile phone) which is an example of an electronic device.

Next, a smartphone is illustrated as an electronic device using the physical quantity sensor 1 and will be described in detail based on FIG. 14. FIG. 14 is a perspective view schematically showing a configuration of a smartphone (mobile phone) which is an example of an electronic device.

In this figure, the smartphone 1200 incorporates the above-described physical quantity sensor 1. A detection signal (acceleration data) detected by the physical quantity sensor 1 is transmitted to a control unit 1201 of the smartphone 1200. The control unit 1201 includes a central processing unit (CPU), and can perform control such as changing a display image displayed on a display unit 1208 by recognizing the posture and behavior of the smartphone 1200 based on the received detection signal, sounding a warning sound or a sound effect, and driving a vibration motor to vibrate a main body. In other words, by performing a motion sensing of the smartphone 1200, display contents can be changed and sounds or vibrations or the like can be generated, from the measured posture and behavior. In particular, when executing a game application, it is possible to experience a realistic feeling close to reality.

The smartphone 1200 as an example of such an electronic device includes the physical quantity sensor 1 capable of efficiently detecting the physical quantity as described above and the control unit 1201, thereby, the smartphone 1200 has excellent reliability.

Note that the electronic device provided with the physical quantity sensor 1 can be applied to, for example, a personal computer, a tablet terminal, a digital still camera, a timepiece, an ink jet type discharging device (for example, an ink jet printer), a laptop type personal computer, a television, a video camera, a video tape recorder, a car navigation device, a pager, an electronic notebook (including an electronic notebook with a communication function), an electronic dictionary, a calculator, an electronic game machine, a word processor, a workstation, a videophone, a television monitor for crime prevention, electronic binoculars, a POS terminal, a medical machine (for example, an electronic thermometer, a sphygmomanometer, a blood glucose meter, an electrocardiogram measuring device, an ultrasonic diagnostic device, an electronic endoscope), a fish finding machine, various measuring machines, an instrument (for example, instrument for a vehicle, an aircraft, a ship), a flight simulator, a seismometer, a pedometer, an inclinometer, a vibration meter for measuring a vibration of a hard disk, a posture control device for flying objects such as a robot and a drone, a control machine used for an inertial navigation for automatic driving of a vehicle, or the like, in addition to the above-described smartphone 1200 (mobile phone).

4. Vehicle

Figure 15:
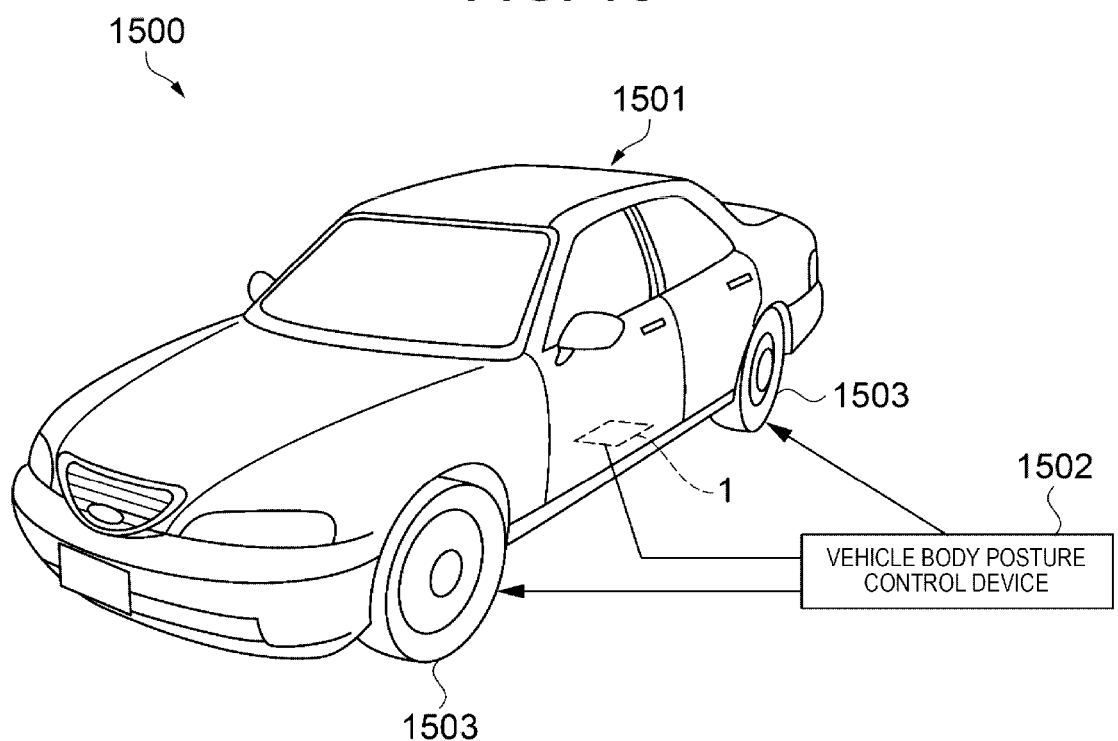
FIG. 15 is a perspective view showing a configuration of a vehicle which is an example of a vehicle.

Next, a vehicle using the physical quantity sensor 1 is shown in FIG. 15 and will be described in detail. FIG. 15 is a perspective view showing a configuration of a vehicle which is an example of a vehicle.

As shown in FIG. 15, the physical quantity sensor 1 is built in the vehicle 1500, and for example, a movement (position) and a posture of a vehicle body 1501 can be detected by the physical quantity sensor 1. A detection signal of the physical quantity sensor 1 is supplied to a vehicle body posture control device 1502 that controls a movement and a posture of the vehicle body, and the vehicle body posture control device 1502 can detect the posture of the vehicle body 1501 based on the signal, and can control a hardness of a suspension or control brakes of individual wheels 1503 according to the detection result.

Note that the physical quantity sensor 1 can be widely applied to an electronic control unit (ECU) such as a key-less entry system, an immobilizer, a car navigation system, a car air conditioner, an anti-lock brake system (ABS), an air bag, a tire pressure monitoring system (TPMS), an engine control system (engine system), an automatic driving inertial navigation control device, a battery monitor for a hybrid vehicle or an electric vehicle, in addition to the examples described above.

Further, the physical quantity sensor 1 applied to a vehicle can be utilized in, for example, a movement or a posture control of a biped robot, a train, or the like, a remote control of a radio controlled aircraft, a radio controlled helicopters, a drone, or the like, a movement or a posture control of an autonomous flying object, a movement or a posture control of an agricultural machine or a construction machine, a control of a rocket, a satellite, a ship, and an automatic guided vehicle (AGV), or the like, in addition to the examples described above. As described above, in realizing movement (position) or posture controls of various vehicles, the physical quantity sensor 1, and each control unit (not shown) or a posture control unit are incorporated.

Such a movable object has excellent reliability because the movable object includes the physical quantity sensor 1 capable of efficiently detecting a physical quantity and a control unit (for example, a vehicle body posture control device 1502 as a posture control unit).

5. Driving Support System

Figure 16:
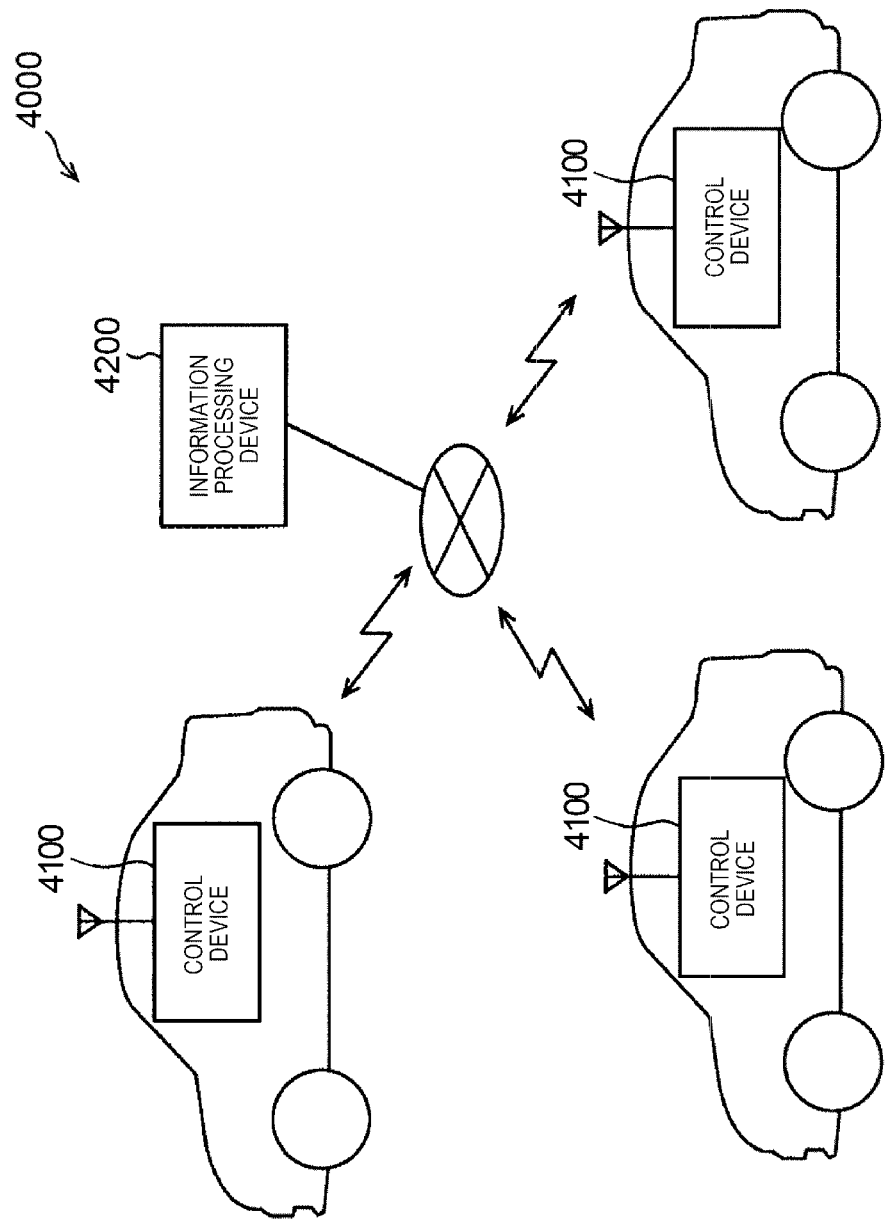
FIG. 16 is a view showing a schematic configuration of a driving support system.
Figure 17:
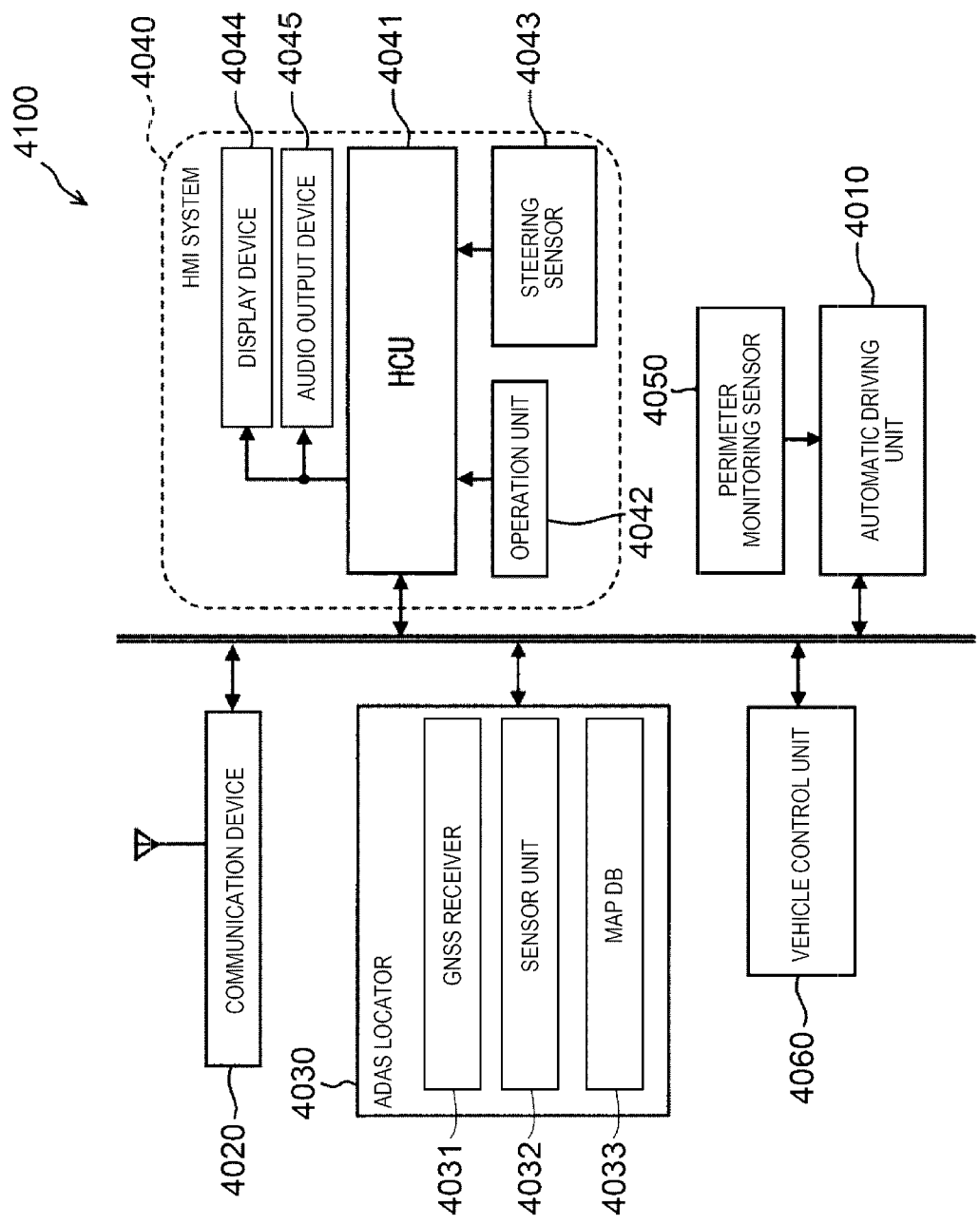
FIG. 17 is a functional block diagram showing a schematic configuration of the driving support system.

Hereinafter, a driving support system using the physical quantity sensor 1 will be described with reference to FIGS. 16 and 17. FIG. 16 is a view showing a schematic configuration of a driving support system. FIG. 17 is a functional block diagram showing a schematic configuration of the driving support system.

Schematic Configuration of Driving Support System

As shown in FIG. 16, the driving support system 4000 includes a control device 4100 and an information processing device 4200 mounted on each of a plurality number of vehicles (vehicles).

Control device 4100 is mounted on a vehicle (hereinafter, automatic driving vehicle) for performing an automatic driving that automatically controls at least one of acceleration, braking, and steering, and communicates with the information processing device 4200. The information processing device 4200 is, for example, a server device, collects vehicle information transmitted from each control device 4100 mounted on the plurality number of automatic driving vehicles, and transmits information obtained based on the collected vehicle information to each control device 4100. Note that the information processing device 4200 may be configured with one server device or may be configured with a plurality of server devices.

Schematic Configuration of Control Device

Subsequently, a schematic configuration of the control device 4100 will be described with reference to FIG. 17. The control device 4100 is mounted on an automatic driving vehicle, and as shown in FIG. 17, includes an automatic driving unit 4010, a communication device 4020, an advanced driver assistance systems (ADAS) locator 4030, an human machine interface (HMI) system 4040, a perimeter monitoring sensor 4050, and a vehicle control unit 4060. The automatic driving unit 4010 as a control unit, the communication device 4020, the ADAS locator 4030, the HMI system 4040, and the vehicle control unit 4060 are connected to, for example, an in-vehicle LAN, and can exchange information with each other through communication.

The communication device 4020 communicates with the outside of a host vehicle. The communication device 4020 can perform wireless communication with, for example, at least one of an in-vehicle communication device mounted on vehicles around the host vehicle and a roadside device installed on the roadside. For example, the communication device 4020 can acquire position information, driving speed information, and the like of vehicles around the host vehicle by performing an inter-vehicle communication with the in-vehicle communication device and a road-to-vehicle communication with the roadside device.

The communication device 4020 communicates with the information processing device 4200. When communication is performed with the information processing device 4200, for example, it may be configured to communicate with the information processing device 4200 via a communication network used in a telematics communication by using an in-vehicle communication module used for the telematics communication such as a data communication module (DCM). Note that a communication may be performed with the information processing device 4200 via a roadside device, and a communication network between the roadside device and the information processing device 4200. The communication device 4020 outputs the information acquired from the information processing device 4200 to the in-vehicle LAN, and transmits the vehicle information transmitted from the automatic driving unit 4010 via the in-vehicle LAN.

Note that an in-vehicle communication module for performing a wireless communication between at least one of the in-vehicle communication device mounted on the around vehicle and the roadside device installed on the roadside, and an in-vehicle communication module used for the telematics communication may be separately provided, or may be integrally provided.

The ADAS locator 4030 is provided with a global navigation satellite system (GNSS) receiver 4031, a sensor unit 4032 including the above-described physical quantity sensor 1, and a map database (hereinafter DB) 4033 storing map data. The GNSS receiver 4031 receives positioning signals from a plurality of artificial satellites. The sensor unit 4032 including the physical quantity sensor 1 is provided with, for example, a three-axis gyro sensor and a three-axis acceleration sensor as other sensors. The map DB 4033 is a nonvolatile memory, and stores map data such as link data, node data, road shapes, and structures.

The ADAS locator 4030 sequentially positioning a vehicle position of the host vehicle equipped with the ADAS locator 4030 by combining the positioning signal received by the GNSS receiver 4031 and the measurement result of the sensor unit 4032 including the physical quantity sensor 1. Note that for the positioning of vehicle position, a driving distance obtained from a pulse signal sequentially output from a wheel speed sensor (not shown) mounted on the vehicle may be used. Then, the vehicle position in which the positioning is performed, is output to the in-vehicle LAN. Further, the ADAS locator 4030 reads the map data from the map DB 4033 and outputs the map data to the in-vehicle LAN. Note that the map data may be acquired from the outside of the host vehicle by using an in-vehicle communication module (not shown) such as, for example, DCM mounted on the host vehicle.

As shown in FIG. 17, the HMI system 4040 includes an human machine interface control unit (HCU) 4041, an operation unit 4042, a steering sensor 4043, a display device 4044, and an audio output device 4045, and receives an input operation from a driver of the host vehicle, presents information to the driver of the host vehicle, and detects a driver status of the host vehicle.

The operation unit 4042 is a switch group operated by a driver of the host vehicle. The operation unit 4042 is used for performing various settings. For example, as the operation unit 4042, there are a steering switch provided in a spoke portion of steering of the host vehicle, a touch switch integrated with the display device 4044, or the like.

The steering sensor 4043 is a sensor for detecting that an occupant is touching the steering wheel of the host vehicle. Examples of the steering sensor 4043 include a touch sensor provided on a steering wheel, a steering torque sensor for detecting a steering torque of the steering of the host vehicle, or the like. The detection result of the steering sensor 4043 is output to the HCU 4041.

As the display device 4044, for example, there are a combination meter, a center information display (CID), a head-up display (HUD), or the like. The combination meter is disposed in front of a driver's seat of the host vehicle. The CID is disposed above a center cluster inside the host vehicle. The combination meter and the CID display various images for information presentation on the display screen of the display based on the image data acquired from the HCU 4041. The HUD projects an image light based on the image data acquired from the HCU 4041 onto a projection area defined on a windshield of the host vehicle. The image light reflected to the vehicle interior by the windshield is perceived by the driver sitting in a driver's seat. The driver can visually recognize the virtual image of the image projected by the HUD superimposed on the external scenery in front of the vehicle.

As the audio output device 4045, for example, there are an audio speaker, or the like. The audio speaker is disposed, for example, in a lining of the door of the host vehicle. The audio speaker presents information to an occupant such as a driver by means of sound to be reproduced.

The HCU 4041 includes a CPU, a memory such as a ROM and a RAM, an I/O, and a bus connecting these, and executes various processing by executing a control program stored in the memory. For example, the HCU 4041 causes at least one of the display device 4044 and the audio output device 4045 to present the information in accordance with an instruction from the automatic driving unit 4010. Note that a part or all of the functions executed by the HCU 4041 may be configured as hardware by one or more ICs or the like.

The perimeter monitoring sensor 4050 detects a vehicle such as a pedestrian, a non-human animal, bicycles, motorcycles, and other vehicles, and further detects an obstacle such as a falling object on the road, a guardrail, a curb, and a stationary object such as a tree. In addition, a road marking such as a driving division line and a stop line are detected. The perimeter monitoring sensor 4050 is, for example, a sensor such as a perimeter monitoring camera that captures a predetermined range around the host vehicle, a millimeter-wave radar that transmits probing waves to a predetermined range around the host vehicle, a sonar, and a light detection and ranging/laser imaging detection and ranging) LIDAR.

The perimeter monitoring camera may be configured to use a stereo camera or may be configured to use a monocular camera. The perimeter monitoring camera sequentially outputs the captured image to be sequentially captured to the automatic driving unit 4010 as sensing information. A sensor that transmits a probing wave such as a sonar, a millimeter wave radar, a LIDAR sequentially outputs a scan result based on a reception signal obtained when a reflection wave reflected by an obstacle to the automatic driving unit 4010 as sensing information. Note that a plurality of types of perimeter monitoring sensors 4050 may have overlapped sensing ranges, for example, a front sensing of the host vehicle is performed with the combination of using a perimeter monitoring camera and a millimeter wave radar, or the like.

The vehicle control unit 4060 is an electronic control device that performs at least one of an acceleration and deceleration control, and a steering control of the host vehicle. As the vehicle control unit 4060, there are a steering ECU for performing a steering control, a power unit control ECU for performing an acceleration and deceleration control, and a brake ECU. The vehicle control unit 4060 acquires detection signals output from each sensor such as an accelerator position sensor, a brake pedal force sensor, a steering angle sensor, a wheel speed sensor mounted on the host vehicle, and outputs a control signal to each driving control device such as an electronically controlled throttle, a brake actuator, an electric power steering (EPS) motor. Further, the vehicle control unit 4060 can output the detection signals of each sensor described above to the in-vehicle LAN.

The automatic driving unit 4010 as a control unit is provided with a CPU, a volatile memory, a nonvolatile memory, an I/O, and a bus connecting these, and executes various processing by executing the control program stored in the non-volatile memory. For example, the automatic driving unit 4010 recognizes a driving environment of the host vehicle from the sensing result of the perimeter monitoring sensor 4050. In addition, the automatic driving unit 4010 substitutes the driving operation by the driver by controlling the vehicle control unit 4060. The automatic driving unit 4010 corresponds to a driving support device.

Note that a part or all of the functions executed by the automatic driving unit 4010 may be configured as hardware by one or more ICs or the like.

The automatic driving unit 4010 as a control unit can instruct the vehicle control unit 4060 to control at least one of acceleration, braking, and steering based on the detection signal detected by the sensor unit 4032. Further, the automatic driving unit 4010 can switch between the execution and the non-execution of the automatic driving according to the change of the detection signal detected by the sensor unit 4032. In this manner, by the automatic driving unit 4010 as a control unit that controls at least one of acceleration, braking, and steering, the execution and the non-execution of the automatic driving can be accurately switched according to the change of the detection signal detected by the sensor unit.

Such a driving support system 4000 for a vehicle (vehicle) has excellent reliability because the driving support system 4000 is provided with the sensor unit 4032 including the physical quantity sensor 1 described above and the automatic driving unit 4010 as a driving support device including the sensor unit 4032.

The physical quantity sensor, the sensor device, the electronic device, and the vehicle (driving support system) according to the present disclosure have been described above based on the illustrated embodiment, but the present disclosure is not limited to this, and the configuration of each portion can be replaced with any configuration having the same function.

Further, any other component may be added to the present disclosure.

In the embodiment described above, the present disclosure is applied to a seesaw type physical quantity sensor (acceleration sensor) as an example, and in the physical quantity sensor of the present disclosure may be any sensor provided that the movable object is displaceable to the substrate. Therefore, the physical quantity sensor of the present disclosure is not limited to the structure of the embodiments described above, and is also applicable to, for example, a flap-type physical quantity sensor.

Hereinafter, the contents derived from the above-described embodiments will be described as each aspect.

Aspect 1

A physical quantity sensor according to present aspect includes a substrate; a movable object disposed displaceably with respect to the substrate; an electrode provided at a position facing the movable object on the substrate; an anchor portion fixing the movable object to the substrate; and a beam that is a rotation shaft of the movable object and connects the anchor portion and the movable object to each other, in which the movable object includes a first mass portion provided at one side of the beam, and a second mass portion provided at the other side of the beam, a first spring provided between the first mass portion and the beam, and a second spring provided between the second mass portion and the beam.

According to the present aspect, when a force (physical quantity) for rotating in a direction intersecting the substrate with the beam as a rotation shaft is applied to the movable object, an entire first mass portion or the second mass portion is displaced in a direction intersecting the substrate by a deflection of the first spring provided between the first mass portion and the beam, and the second spring provided between the second mass portion and the beam in a direction intersecting the substrate. Therefore, when the electrode provided on the substrate is facing the first mass portion and the second mass portion, a large displacement of the first mass portion and the second mass portion can be detected not only at a distal end position of the first mass portion or the second mass portion but also in a part close to the beam. That is, the displacement of the first mass portion and the second mass portion can be efficiently detected by the electrode having a wide area. Thereby, it is possible to obtain a physical quantity sensor in which a detection sensitivity with respect to a force (physical quantity) is improved.

Aspect 2

The physical quantity sensor according to the above aspect may include a second beam fixed to the substrate and connected to the first mass portion, and a third beam fixed to the substrate and connected to the second mass portion.

According to the present aspect, in addition to the beam, the first mass portion is fixed to the substrate by the second beam, and the second mass portion is fixed to the substrate by the third beam, thereby the displacement of the first mass portion and the second mass portion can be supported by a plurality of beams. Thereby, the displacement of the first mass portion and the second mass portion with respect to a force (physical quantity) can be stabilized, and a detection accuracy can be improved.

Aspect 3

The physical quantity sensor according to the above aspect may include a frame portion positioned at an outer periphery of the movable object and provided with a gap from the movable object, a second beam connecting the frame portion and the first mass portion to each other, and a third beam connecting the frame portion and the second mass portion to each other.

According to the present aspect, in addition to the beam, the first mass portion is fixed to the substrate by the frame portion connected by the second beam, and the second mass portion is fixed to the substrate by the frame portion connected by the third beam. Since the frame portion is positioned at the outer periphery of the movable object, it can be reliably fixed to the substrate, and the displacement of the first mass portion and the second mass portion can be supported by the plurality of beams. Thereby, the displacement of the first mass portion and the second mass portion with respect to a force (physical quantity) can be stabilized, and a detection accuracy can be improved.

Aspect 4

In the physical quantity sensor according to the above aspect, a mass of the second mass portion may be larger than a mass of the first mass portion.

According to the present aspect, moments around a center shaft of oscillation of the first mass portion and the second mass portion can be easily made different.

Aspect 5

In the physical quantity sensor according to the above aspect, the electrode may include a first electrode facing the first mass portion and a second electrode facing the second mass portion.

According to the present aspect, a so-called seesaw-type electrostatic capacitance type acceleration sensor can be realized.

Aspect 6

In the physical quantity sensor according to the above aspect, the first spring and the beam may be connected to each other by a first connecting portion, the second spring and the beam may be connected to each other by a second connecting portion, and rigidity of the beam may be lower than rigidity of the first connecting portion and the second connecting portion.

According to the present aspect, since the first connecting portion and the second connecting portion are less likely to deform than the beam, the rotation of the beam when a force (physical quantity) is applied to the movable object such that the beam rotates in a direction intersecting the substrate as a rotation shaft, can be transmitted to the first spring and the second spring by rotational displacement of the first connecting portion and the second connecting portion.

Aspect 7

A sensor device according to present aspect includes any one of the physical quantity sensors described above and an electronic component electrically coupled to the physical quantity sensor.

According to the present aspect, since the physical quantity sensor with an improved detection sensitivity with respect to a force (physical quantity) is provided, a sensor device with an improved detection sensitivity with respect to a force (physical quantity) can be obtained.

Aspect 8

An electronic device according to the present aspect includes any one of the physical quantity sensors described above and a control unit that performs a control based on a detection signal output from the physical quantity sensor.

According to the present aspect, since the physical quantity sensor with an improved detection sensitivity with respect to a force (physical quantity) is provided, an electronic device with an improved detection sensitivity with respect to a force (physical quantity) can be obtained.

Aspect 9

A vehicle according to the present aspect includes any one of the physical quantity sensors described above and a control unit that performs a control based on a detection signal output from the physical quantity sensor.

According to the present aspect, since the physical quantity sensor with an improved detection sensitivity with respect to a force (physical quantity) is provided, a vehicle with an improved detection sensitivity with respect to a force (physical quantity) can be obtained.

What is claimed is:
1. A physical quantity sensor comprising:
a substrate;
a movable object disposed displaceably with respect to the substrate;
an electrode provided at a position facing the movable object on the substrate;
an anchor portion fixing the movable object to the substrate; and
a beam that is a rotation shaft of the movable object and connects the anchor portion and the movable object to each other, wherein
the movable object includes:
a first mass portion provided at one side of the beam, and a second mass portion provided at the other side of the beam,
a first spring provided between the first mass portion and the beam,
a second spring provided between the second mass portion and the beam,
a second beam is fixed to the substrate and connected to the first mass portion,
a third beam is fixed to the substrate and connected to the second mass portion,
a frame portion is positioned at an outer periphery of the movable object and provided with a gap from the movable object,
the second beam connecting the frame portion and the first mass portion to each other, and
the third beam connecting the frame portion and the second mass portion to each other.
2. The physical quantity sensor according to claim 1, wherein
a mass of the second mass portion is larger than a mass of the first mass portion.
3. The physical quantity sensor according to claim 1, wherein the electrode includes a first electrode facing the first mass portion and a second electrode facing the second mass portion.

4. The physical quantity sensor according to claim 1, wherein
the first spring and the beam are connected to each other by a first connecting portion,
the second spring and the beam are connected to each other by a second connecting portion, and
rigidity of the beam is lower than rigidity of the first connecting portion and the second connecting portion.

5. A sensor device comprising:
the physical quantity sensor according to claim 1; and
an electronic component electrically coupled to a physical quantity sensor.

6. An electronic device comprising:
the physical quantity sensor according to claim 1; and
a control unit that performs a control based on a detection signal output from a physical quantity sensor.

7. A vehicle comprising:
the physical quantity sensor according to claim 1; and
a control unit that performs a control based on a detection signal output from a physical quantity sensor.

8. A physical quantity sensor comprising:
a substrate;
a movable object disposed displaceably with respect to the substrate;
an electrode provided at a position facing the movable object on the substrate;
an anchor portion fixing the movable object to the substrate; and
a beam that is a rotation shaft of the movable object and connects the anchor portion and the movable object to each other, wherein
the movable object includes
a first mass portion provided at one side of the beam, and a second mass portion provided at the other side of the beam,
a first spring provided between the first mass portion and the beam,
a second spring provided between the second mass portion and the beam,
the first spring and the beam are connected to each other by a first connecting portion, the second spring and the beam are connected to each other by a second connecting portion, and rigidity of the beam is lower than rigidity of the first connecting portion and the second connecting portion.

9. A sensor device comprising:
the physical quantity sensor according to claim 8; and
an electronic component electrically coupled to a physical quantity sensor.

10. An electronic device comprising:
the physical quantity sensor according to claim 8; and
a control unit that performs a control based on a detection signal output from a physical quantity sensor.

11. A vehicle comprising:
the physical quantity sensor according to claim 8; and
a control unit that performs a control based on a detection signal output from a physical quantity sensor.

* * * * *